US009659434B2

(12) United States Patent
Bainbridge et al.

(10) Patent No.: US 9,659,434 B2
(45) Date of Patent: May 23, 2017

(54) MODULAR WAGERING GAME MACHINE SIGNAGE

(75) Inventors: Scott C. Bainbridge, Chicago, IL (US); Paul C. Barker, Chicago, IL (US); Arturo E. Mancilla, San Francisco, CA (US); Scott M. Minch, Wheeling, IL (US)

(73) Assignee: BALLY GAMING, INC., Las Vegas, NV (US)

( * ) Notice: Subject to any disclaimer, the term of this patent is extended or adjusted under 35 U.S.C. 154(b) by 1546 days.

(21) Appl. No.: 12/809,578

(22) PCT Filed: Dec. 19, 2008

(86) PCT No.: PCT/US2008/087782
§ 371 (c)(1),
(2), (4) Date: Nov. 5, 2010

(87) PCT Pub. No.: WO2009/086169
PCT Pub. Date: Jul. 9, 2009

(65) Prior Publication Data

US 2011/0070948 A1 Mar. 24, 2011

Related U.S. Application Data

(60) Provisional application No. 61/015,097, filed on Dec. 19, 2007, provisional application No. 61/043,120, filed on Apr. 7, 2008.

(51) Int. Cl.
*G06F 19/00* (2011.01)
*G07F 17/32* (2006.01)

(52) U.S. Cl.
CPC ................................ *G07F 17/3218* (2013.01)

(58) Field of Classification Search
USPC .................................. 463/16, 20, 30, 32, 34
See application file for complete search history.

(56) References Cited

U.S. PATENT DOCUMENTS 2,801,868 A * 8/1957 Carson .................... E05C 3/042 292/202
2,912,294 A * 11/1959 Wells ..................... A47B 87/02 312/111

(Continued)

FOREIGN PATENT DOCUMENTS

WO WO-2009086169 7/2009

OTHER PUBLICATIONS

"PCT Application No. PCT/US08/87782 International Preliminary Report on Patentability", Jan. 27, 2010 , 15 pages.

(Continued)

*Primary Examiner* — Paul A D'Agostino
(74) *Attorney, Agent, or Firm* — DeLizio Law, PLLC

(57) ABSTRACT

Modular wagering game machine signage is described herein. In some embodiments, a modular wagering game machine sign can include a center module including a plurality of support members, at least one outer panel covering the frame, and a lighted faceplate including lighting units. The lighting units can include light emitting diodes (LEDs) and globes. The sign can also includes at least one side module connected to the center module via hand-spinning latches configured to press against one or more of the center module s support members.

24 Claims, 25 Drawing Sheets

(56) References Cited

U.S. PATENT DOCUMENTS 3,378,320 A * 4/1968 Morgan ................. A47B 47/03 174/560
3,588,212 A * 6/1971 Gersch et al. ......... A47B 47/00 312/204
3,650,584 A * 3/1972 Goetz, Jr. ................ H04N 5/64 312/7.2
3,854,374 A * 12/1974 Boyle ................. F16B 19/1081 174/138 D
3,883,196 A * 5/1975 Mohr ..................... A47B 17/00 312/111
4,191,236 A * 3/1980 Duran ..................... F16B 39/32 411/105
4,411,480 A * 10/1983 Gibson .................... H04N 5/64 312/242
4,428,155 A * 1/1984 Kwan .................... B60J 7/1642 16/261
4,440,457 A * 4/1984 Fogelman ........... G07F 17/3216 312/223.3
4,784,550 A * 11/1988 Wollar ................ F16B 19/1081 411/32
4,798,424 A * 1/1989 Coates .................... D06F 39/12 248/558
5,176,435 A * 1/1993 Pipkens ................. A47B 17/00 312/204
5,180,201 A * 1/1993 Hauber ................... E05B 5/003 292/336.3
5,584,549 A * 12/1996 Lybarger ................. D06F 39/12 220/835
5,647,648 A * 7/1997 Duesler ................... G09F 23/00 312/108
5,720,480 A * 2/1998 Lawlor ................... A63F 7/027 273/118 A
5,813,914 A * 9/1998 McKay ................... G07F 17/32 273/143 R
5,897,167 A * 4/1999 Keith ..................... A47C 7/383 297/397
5,951,131 A * 9/1999 Stefan .................... A47B 47/02 312/257.1
6,086,174 A * 7/2000 Graves ................... A47B 47/03 312/263
6,719,337 B1 * 4/2004 Ji .......................... E05C 19/022 292/110
6,820,875 B1 * 11/2004 Hedrick .................. A63F 13/08 273/138.1
7,108,606 B1 * 9/2006 Luciano ................ G07F 17/322 361/679.57
7,459,002 B2 * 12/2008 Kalous .................. F24F 3/1607 273/287
7,900,922 B1 * 3/2011 Mallory .................. G07F 17/34 273/138.1
8,002,637 B1 * 8/2011 Mitchell ................. G07F 17/32 273/138.1
8,079,655 B2 * 12/2011 Compton ............. A47B 83/001 312/351
8,226,488 B2 * 7/2012 Chen ..................... G06F 13/385 463/43
8,303,420 B2 * 11/2012 Chudek ................... G07F 17/32 463/46
8,454,444 B2 * 6/2013 Cole ....................... G07F 17/32 273/138.1
8,808,094 B2 * 8/2014 Desimone ........... G07F 17/3211 463/30
2002/0006828 A1 * 1/2002 Gerding .................. A63F 13/08 463/46
2002/0195827 A1 * 12/2002 Jackson ................. B64D 29/06 292/219
2003/0081399 A1 * 5/2003 Davis ...................... G06F 1/181 361/818
2003/0124027 A1 * 7/2003 Swider ................. G01N 1/2205 422/62
2004/0018870 A1 * 1/2004 Cole ....................... A63F 13/08 463/20
2004/0045200 A1 * 3/2004 Hillstrom ............ G09F 13/0413 40/574
2004/0090151 A1 * 5/2004 Nagano ................... G07F 17/32 312/223.1
2004/0102245 A1 * 5/2004 Escalera et al. ................ 463/32
2004/0142753 A1 * 7/2004 Beadell ................... G07F 17/32 463/46
2004/0162146 A1 * 8/2004 Ooto ....................... A63F 13/08 463/46
2004/0192433 A1 * 9/2004 Johnson .................. A63F 13/08 463/20
2004/0214645 A1 * 10/2004 Hedrick .............. G07F 17/3216 463/46
2005/0054449 A1 * 3/2005 Kopera ............... G07F 17/3216 463/46
2005/0064941 A1 * 3/2005 Hedrick .................. A63F 13/08 463/46
2005/0064942 A1 * 3/2005 Hedrick .................. A63F 13/08 463/46
2005/0096137 A1 * 5/2005 Seelig ................. G07F 17/3216 463/46
2005/0159209 A1 * 7/2005 Fiden .................. G07F 17/3244 463/20
2005/0183143 A1 * 8/2005 Anderholm et al. ........... 726/22
2005/0192101 A1 * 9/2005 Businger ................. E05B 1/003 463/46
2005/0215325 A1 * 9/2005 Nguyen .............. G07F 17/3202 463/46
2005/0255924 A1 * 11/2005 Cole ....................... A63F 13/08 463/46
2005/0277468 A1 * 12/2005 Fitzsimons ......... G07F 17/3211 463/31
2005/0288104 A1 * 12/2005 Walsh ..................... A63F 13/08 463/46
2006/0073900 A1 * 4/2006 Cole ....................... G07F 17/32 463/46
2006/0128477 A1 * 6/2006 Cole ....................... G07F 17/32 463/46
2006/0148577 A1 * 7/2006 Vitito ..................... B60K 35/00 463/46
2006/0172805 A1 8/2006 Okada
2006/0183553 A1 * 8/2006 Kiriyama ............ G07F 17/3216 463/46
2006/0186622 A1 * 8/2006 Darling .................. A61G 1/013 280/35
2006/0199647 A1 * 9/2006 Anderson ............... A63F 13/08 463/46
2006/0281558 A1 * 12/2006 Rifkin ................. G07F 17/3216 463/46
2006/0287112 A1 * 12/2006 Mallory .............. G07F 17/3216 463/46
2007/0054742 A1 * 3/2007 McComb ............ G07F 17/3216 463/46
2007/0076405 A1 * 4/2007 Ericson ............... G09F 15/0025 362/23.19
2007/0111776 A1 * 5/2007 Griswold ................ G07F 17/32 463/16
2007/0149281 A1 * 6/2007 Gadda et al. ................... 463/34
2007/0167202 A1 * 7/2007 Belzile ..................... A47G 1/12 463/4
2007/0225078 A1 * 9/2007 Rodriguez .............. G07F 17/32 463/46
2007/0287544 A1 * 12/2007 Hirato ..................... G07F 17/32 463/46
2007/0293301 A1 * 12/2007 Seelig et al. .................... 463/20
2008/0039213 A1 * 2/2008 Cornell ................... G07F 17/32 463/46
2008/0046953 A1 * 2/2008 Kossila ......................... 725/132
2008/0113740 A1 * 5/2008 McGahn ................. G07F 17/32 463/20
2008/0113741 A1 * 5/2008 Beadell ................... G07F 17/32 463/20
2008/0113818 A1 * 5/2008 Beadell ................... A63F 13/08 463/46
2008/0113820 A1 * 5/2008 Tedsen ................ G07F 17/3216 463/46

(56) References Cited

U.S. PATENT DOCUMENTS

| | | | | |
|---|---|---|---|---|
| 2008/0113821 | A1* | 5/2008 | Beadell | G07F 17/3216 463/46 |
| 2008/0119288 | A1* | 5/2008 | Rasmussen | G07F 17/3216 463/46 |
| 2008/0182642 | A1* | 7/2008 | Cole | G07F 17/32 463/20 |
| 2008/0188304 | A1* | 8/2008 | Escalera et al. | 463/32 |

OTHER PUBLICATIONS

"PCT Application No. PCT/US08/87782 International Search Report", Apr. 16, 2009 , 9 pages.

* cited by examiner

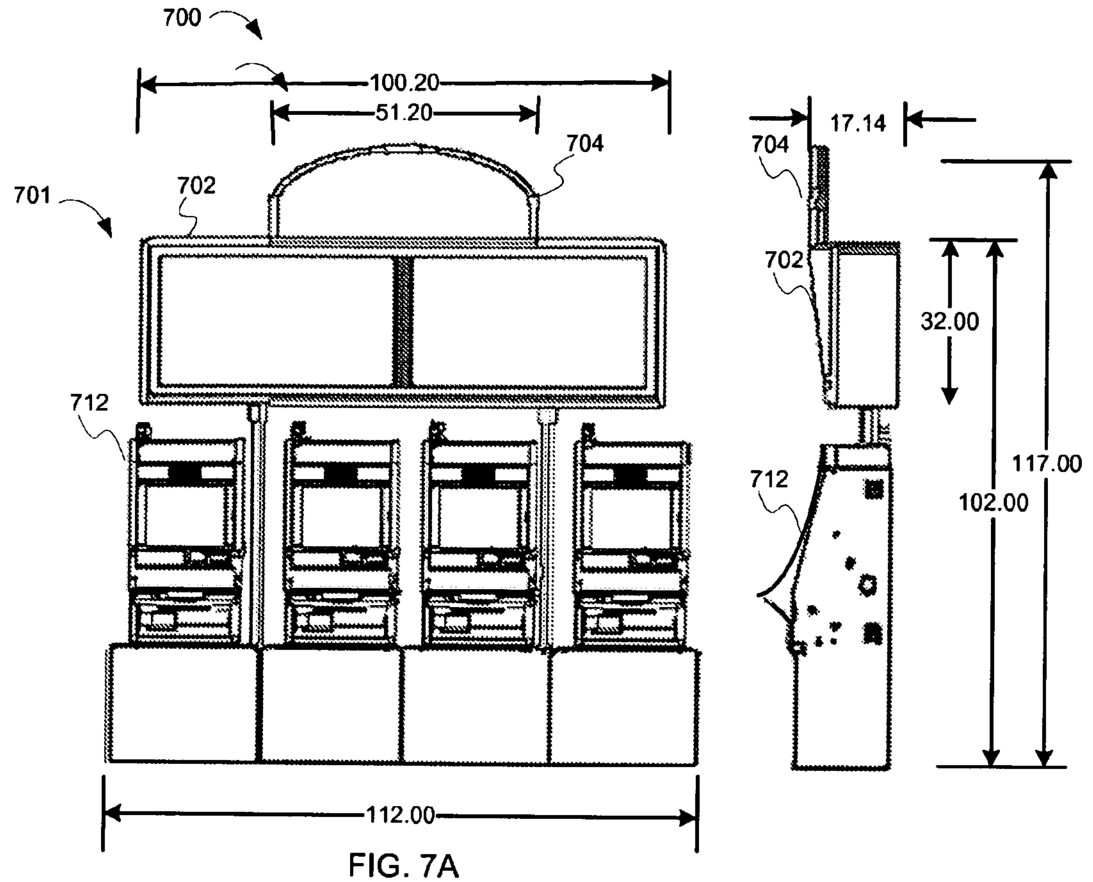
FIG. 7A
FIG. 7B
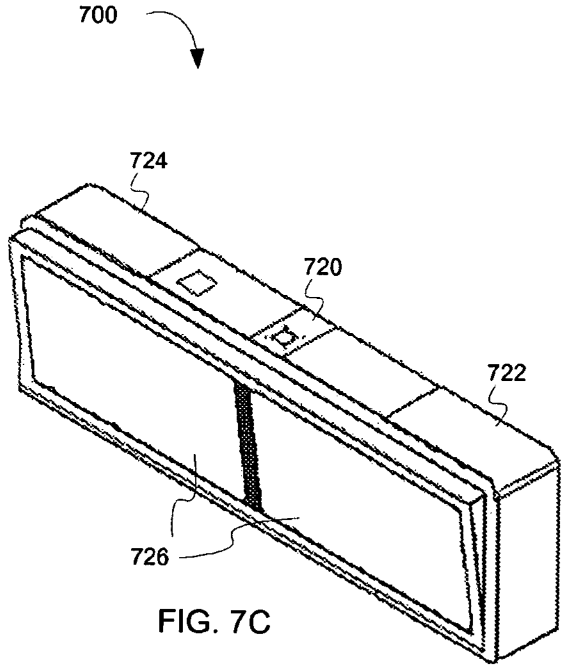
FIG. 7C

MODULAR WAGERING GAME MACHINE SIGNAGE

RELATED APPLICATIONS

This application claims the priority benefit of U.S. Provisional Application Ser. No. 61/015,097 filed Dec. 19, 2007 and U.S. Provisional Application Ser. No. 61/043,120 filed Apr. 7, 2008.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2008, WMS Gaming, Inc.

FIELD

Embodiments of the inventive subject matter relate generally to wagering game systems, and more particularly to modular wagering game signage.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

SUMMARY

In some embodiments, a modular wagering game machine sign includes a center module includes, a plurality of support members; at least one outer panel covering the frame; a lighted faceplate includes lighting units, wherein each lighting unit includes a light emitting diode (LED) and a globe; at least one side module connected to the center module via hand-spinning latches configured to press against one or more of the center module's support members.

In some embodiments, the globe is a solid mass.

In some embodiments, the globe is hollow inside.

In some embodiments, the lighted faceplate includes snap-in fasteners configured hold the lighted faceplate to one or more of the center module's support members.

In some embodiments, the center module includes a swing arm connected to a display device, wherein the swing arm can rotate the display device away from the center module.

In some embodiments, the swing arm rotates in a horizontal plane.

In some embodiments, the swing arm rotates in a vertical plane.

In some embodiments, a modular wagering game sign comprises an auxiliary sign; a sign module includes, a frame covered by an enclosure; a quick-release coupling mounted on the frame, wherein the quick-release coupling includes a receiver configured to receive the auxiliary sign component, a spring-actuated pin to hold the auxiliary sign component in the receiver, and a handle connected to the spring-actuated pin.

In some embodiments, the sign module further includes a display device; and a swing arm coupled to the frame and the display device, wherein the swing arm is configured to rotate the display device away from the sign module exposing electronic components.

In some embodiments, the auxiliary sign component is connected to a marquee mounted above the sign module.

In some embodiments, the auxiliary sign component is connected to an auxiliary sign oriented beside the sign module.

In some embodiments, the modular wagering game sign further includes a platform to support the sign module rest; and another sign module on the platform, the sign modules coupled hand-spinning via latches.

In some embodiments, the modular wagering game sign further includes lighting units including light emitting diodes and globes.

In some embodiments, the globes are hollow.

In some embodiments, the globes are solid.

In some embodiments, a modular wagering game machine sign includes a master module includes, means for holding a marquee above the master module; means for mounting electronic components inside the master module; means for rotating one or more display devices and exposing the electronic components; at least one auxiliary module connected to the master module, the auxiliary module includes, means for mounting lighting inside the auxiliary module; means for holding an auxiliary sign in proximity to the auxiliary module; means for supporting the master module and the at least one auxiliary module; and means for coupling the at least one auxiliary module to the master module.

In some embodiments, the modular wagering game machine sign is double sided and the master module includes, another means for holding a marquee above the master module; another means for mounting electronic components inside the master module; and another means for rotating one or more display devices and exposing the electronic components.

In some embodiments, the means for rotating the display device includes means for rotating the display device's viewing angle.

In some embodiments, the modular wagering game machine sign includes another master module connected the master module and the at least one auxiliary module.

In some embodiments, the modular wagering game machine sign further comprises a lighted faceplate coupled to the master module via snap-in connectors, the lighted face plate including means for lighting the faceplate.

In some embodiments, the means for lighting the faceplate is configured to present bonus game content associated with a wagering game machine.

In some embodiments, the means for mounting lighting inside the auxiliary module includes a translucent.

In some embodiments, a modular wagering game machine sign to present wagering game information, the modular wagering game machine sign comprises a center module including, mounting slots to receive with one or more other modules; electrical components mounted inside the center module; a first blind-mating electrical connector coupled to the electrical components; and a video display device connected to the electrical components; at least one support member connected to the center module to hold the center module above a bank of wagering game machines; and at least one side module includes, studs to protrude though the slots and connect the side module to the center module; a second blind mating electrical connector configured to connect to the first blind-mating connector.

In some embodiments, the center module further includes a hinge for orienting the display device at different viewing angles.

In some embodiments, the center module includes another video display device.

BRIEF DESCRIPTION OF THE FIGURES

Embodiments of the invention are illustrated in the Figures of the accompanying drawings in which:

FIG. 7A illustrates a frontal view of a wagering game machine sign including two display devices;

FIG. 7B illustrates a side view of the bank 700;

FIG. 7C is an isometric view of modular wagering game machine sign in which a plurality of modules house a plurality of display devices;

In FIG. 12, the faceplate 1206 is shaped to fit over the frame 1200;

DESCRIPTION OF THE EMBODIMENTS

This description of the embodiments is divided into five sections. The first section provides an introduction to embodiments of the invention, while the second section describes example wagering game machine architectures. The third section describes example operations performed by some embodiments and the fourth section describes example wagering game machines in more detail. The fifth section presents some general comments.

Introduction

This section provides an introduction to some embodiments of the invention.

Wagering game machines can present various games (e.g., slots, blackjack, Texas Hold 'Em, etc.) and have various themes (e.g., movie themes, game show themes, celebrity themes, etc.). Wagering game machines that have common games and/or themes can be grouped together in banks. Each bank can include a sign to advertise the game and/or theme. The signs can include bright lights, display devices (e.g., LCD displays), motors, and other components that attract players to the bank. FIG. 1 illustrates these concepts.

Figure 1A:
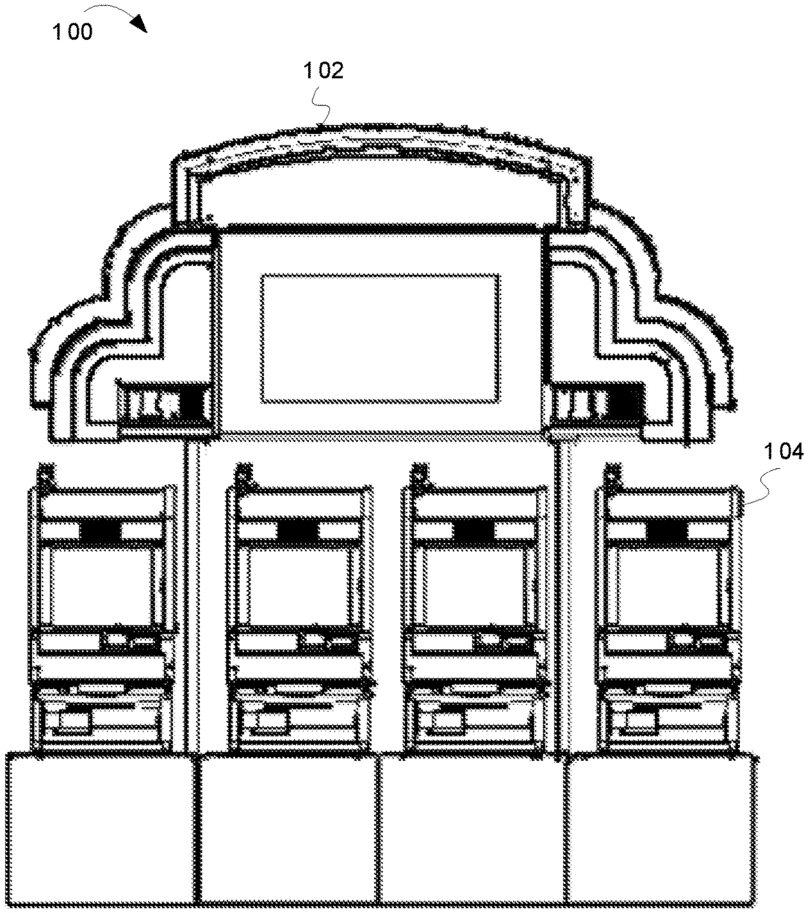
FIG. 1A is a frontal view of a machine bank including wagering game machines and an overhead sign.
Figure 1B:
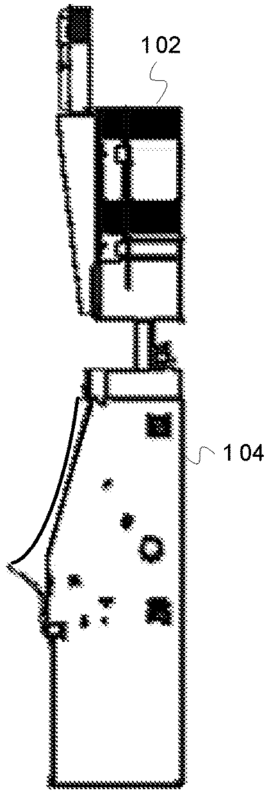
FIG. 1B is a side view of a bank of wagering game machines with overhead sign.

FIG. 1A is a frontal view of a machine bank including wagering game machines and an overhead sign. As shown in FIG. 1, the bank 100 includes a plurality of wagering game machines 104 and a sign 102. The sign 102 can include a display device that presents video content (e.g., information about wagering games) to attract players to the bank 100. FIG. 1B shows a side view of the wagering game machines 104 and the sign 102. Although FIGS. 1A & 1B show the sign 102 with a plurality of wagering game machines, in some instances, the sign 102 may serve a single wagering game machine.

In some instances, casino operators may want to convert the wagering game machines 104 from one theme/game to another. Popularity and player demand may motivate such a conversion. Converting the bank can include replacing software and/or hardware in the wagering game machines 104 and modifying the sign 102. The sign 102 is modularly designed, so replacing components during a conversion is easy and efficient. The following discussion will describe the modularity of different signs, as well as other features.

Sign Modules

Figure 2:
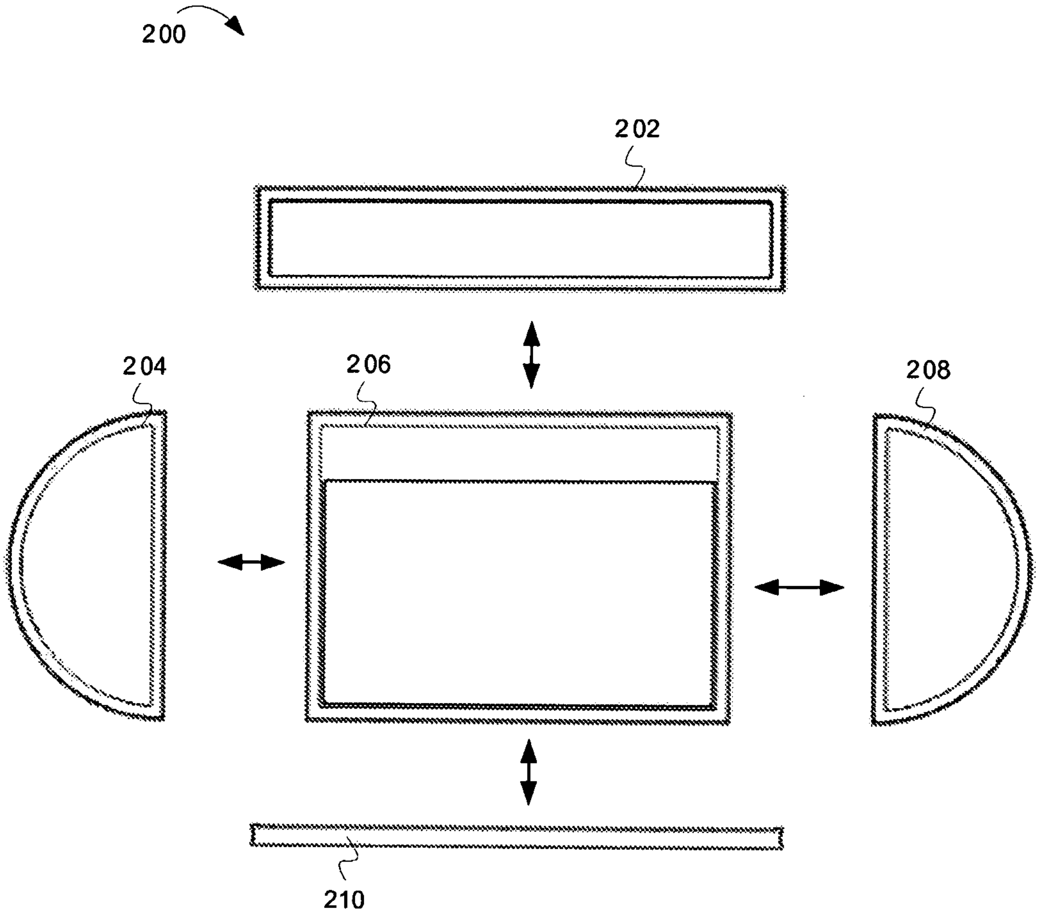
FIG. 2 is a frontal view of modular components that fit together to form a wagering game machine sign, according to some embodiments of the invention.

FIG. 2 is a frontal view of modular components that fit together to form a wagering game machine sign, according to some embodiments of the invention. As shown, the modular wagering game sign 200 includes multiple modules that are interchangeable. By design, the peripheral modules 202, 204, 208, & 210 can attach and detach (see arrows) from the center module 206 (a.k.a. the master module). The peripheral modules include a left module 204, right module 208, top module 202, and bottom module 210. The modular wagering game sign 200 may have a variety of different physical appearances. The sign 200 can easily change its appearance, as differently shaped modules can be attached to the center module 206. In some embodiments, the center module 206 is a basic element that will not change. In some embodiments, the sing 200 can include two master modules, but no other modules. In some embodiments, the modular sign includes a platform configured to support one or more of its modules. For example, the sign 200 can include a platform (not shown) on which the modules (202, 204, 208, 210) sit.

Figure 3A:
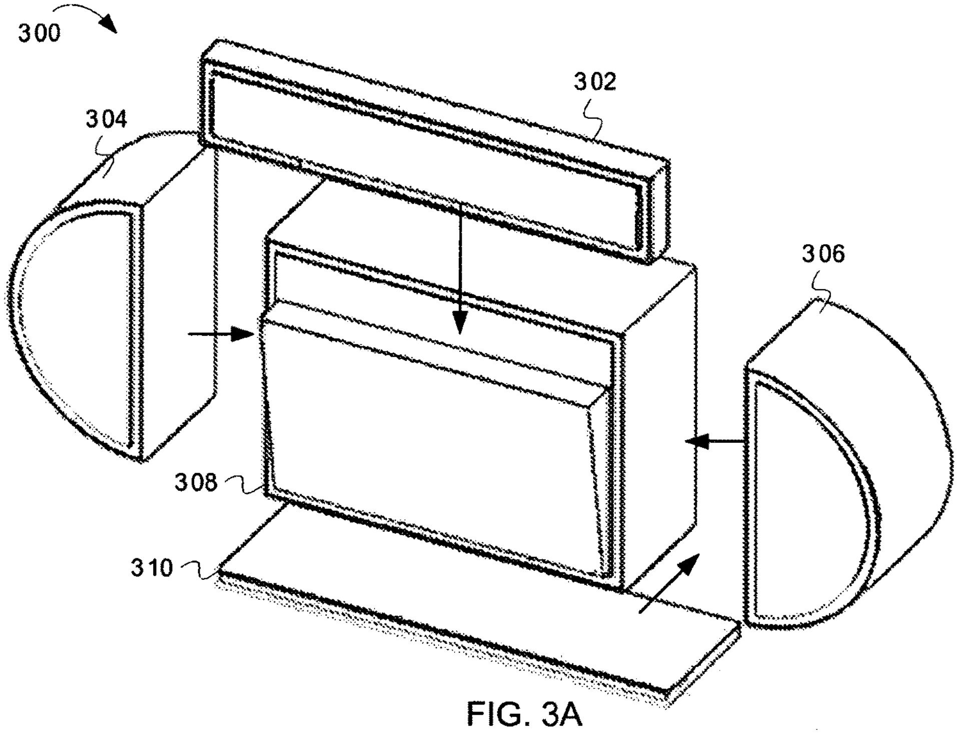
FIG. 3A is an isometric view of modular components that fit together to form a wagering game machine sign, according to some embodiments of the invention.
Figure 3B:
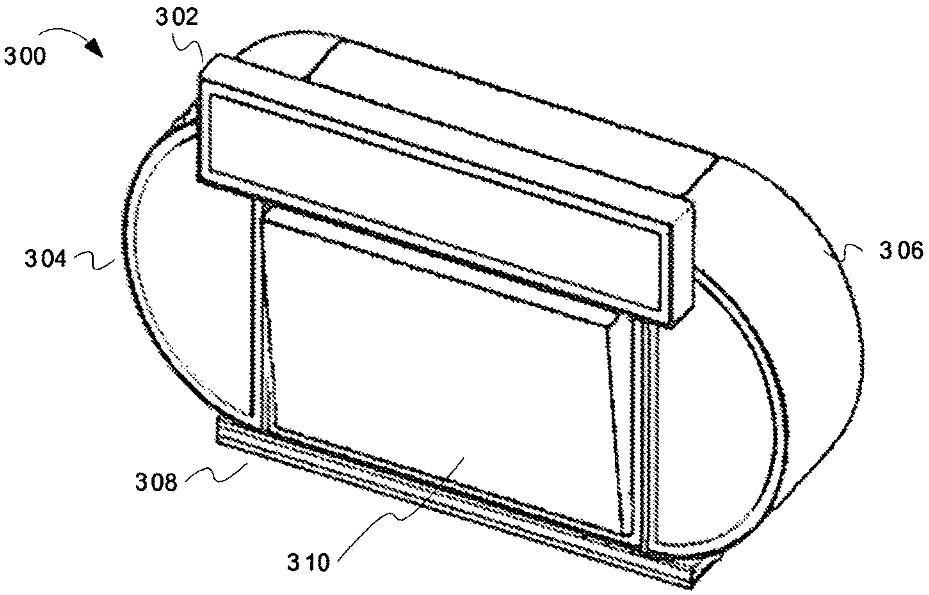
FIG. 3B is an isometric view of the modular components coupled together to form a modular wagering game machine sign.

FIG. 3A is an isometric view of modular components that fit together to form a wagering game machine sign, according to some embodiments of the invention. The modular wagering game machine sign 300 includes a left module 304, right module 306, top module 302, bottom module 310, and center module 308. As shown (see arrows), all the modules couple together to form a wagering game machine sign. FIG. 3B is an isometric view of the modular components coupled together to form a modular wagering game machine sign 300.

Figure 4:
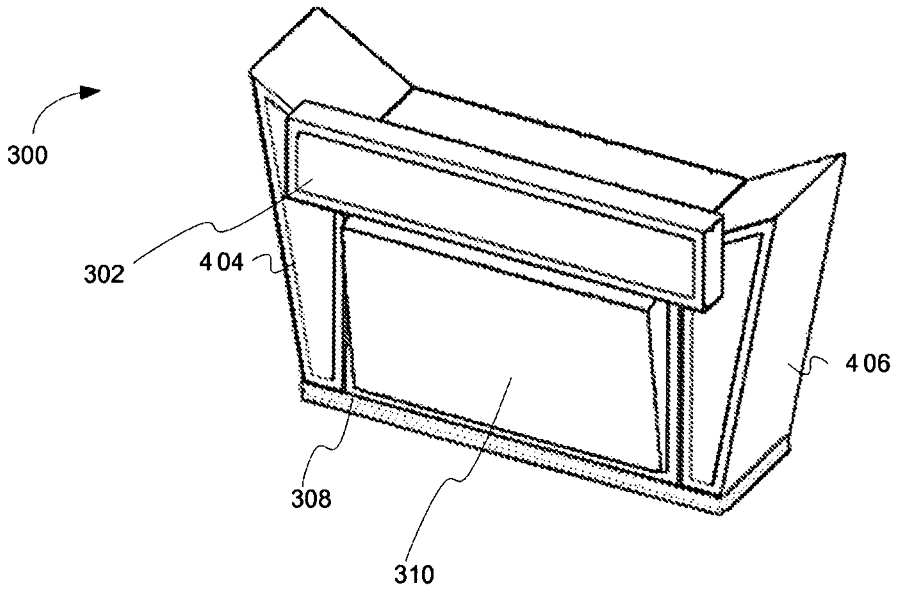
FIG. 4 is an isometric view of the modular wagering game machine sign 300 with different left and right modules.

FIG. 4 is an isometric view of the modular wagering game machine sign 300 with different left and right modules. As shown, the left module 404 and right module 406 connect with the center module 308, top module 302, and bottom module 310. As a result, the modular wagering game machine sign 300 can change shape by replacing various modules. Although not shown, other shapes can be achieved by using different left and right modules, and different top and bottom modules.

In some embodiments, during initial installation at a casino site, installation of the center module 308 may call for two field technicians. However, the addition of all other modules should require only a single field technician. As a result, theme conversions and other changes should only require a single field technician. Theme conversions and other sign changes can entail changing modules, change bezels and upgrading lighting, thus providing a new and different looking sign.

Figure 5A:
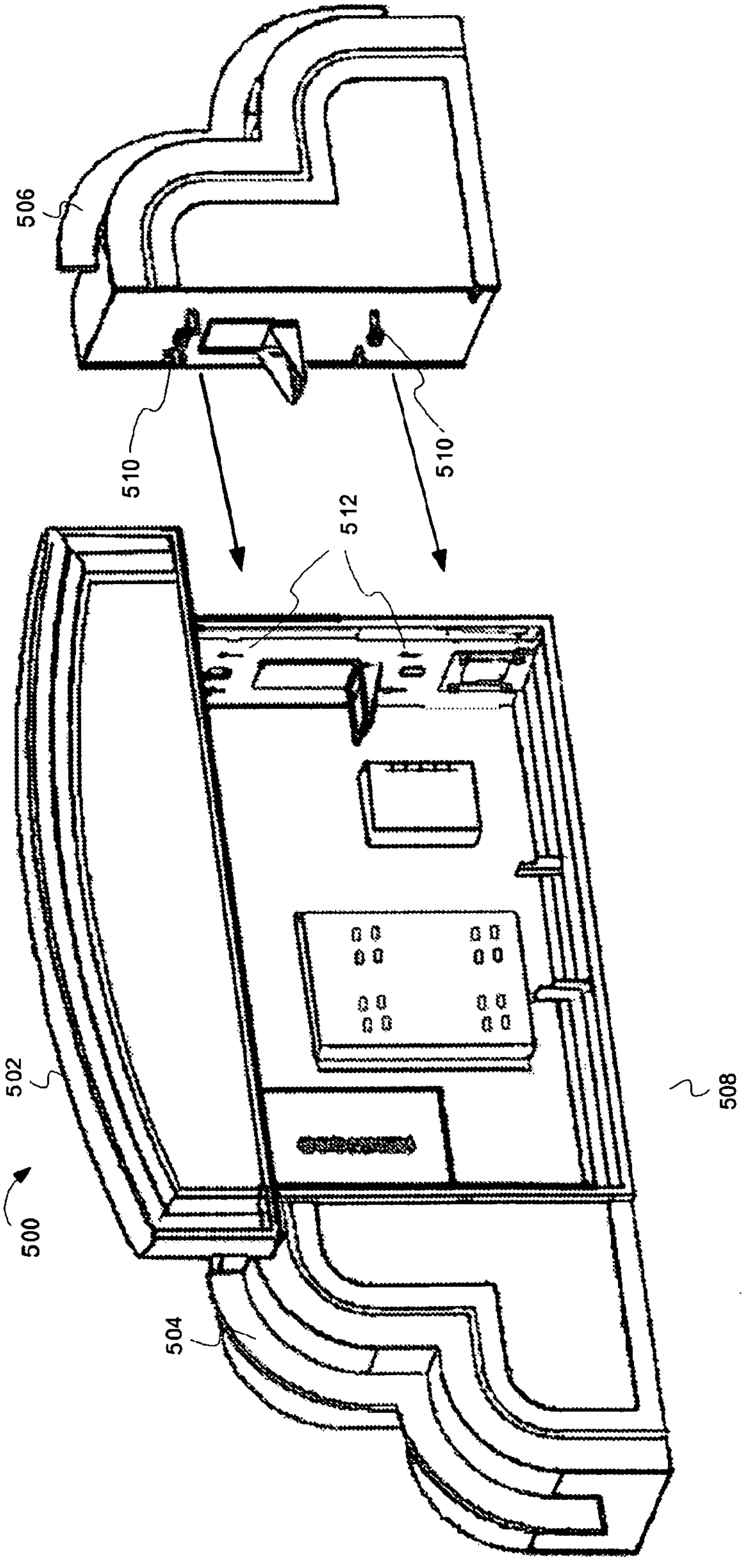
FIG. 5A illustrates an isometric view of another embodiment of the modular wagering a machine sign.

FIG. 5A illustrates an isometric view of another embodiment of the modular wagering a machine sign. The sign 500 includes a top module 502, left module 504, right module 506, and center module 508. The modules for the sign 500 are shaped differently than those described above. As shown, the right module 506 can couple with the center module 508 by inserting the right module's threaded studs 510 into the central module's mounting slots 512. The left module 504 can couple with the center module in the same way.

Figure 5B:
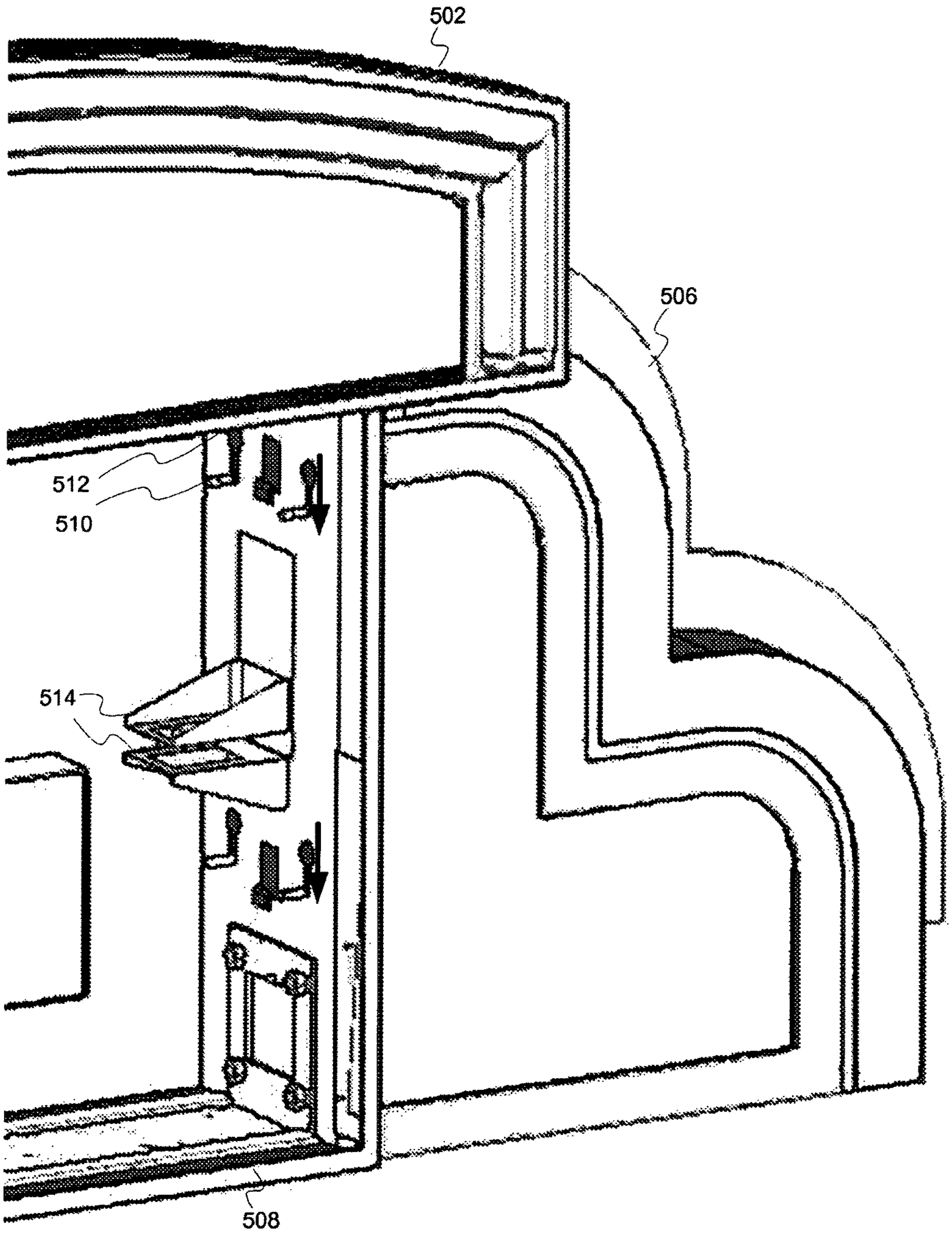
FIG. 5B illustrates an isometric view of the right module 506 coupled to the center module 508.

FIG. 5B illustrates an isometric view of the right module 506 coupled to the center module 508. As shown, the right module 506 is mated to the center module 508. The right module's studs 510 have been inserted through the center module's mounting slots 512. After the studs 510 are inserted into the mounting slots 512, the right module 506 can move downward into position (see arrows). Once in position, nuts can thread onto the studs 510, fastening the modules together. After mounting, the module's electrical connector mounts 514 connect together, forming an electrical connection.

Display Device Features

Size and Number of Display Devices

Figure 6A:
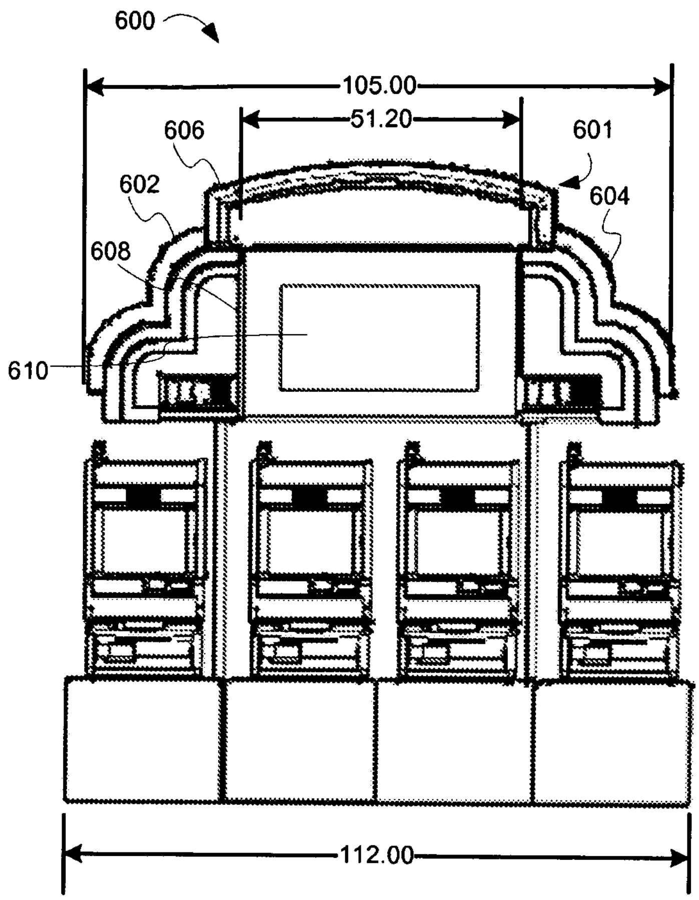
FIG. 6A illustrates a front view of a wagering game machine bank with a modular wagering game machine sign.

FIG. 6A illustrates a front view of a wagering game machine bank with a modular wagering game machine sign. The wagering game machine bank 600 includes a modular wagering game machine sign 601 including the left module 602, right module 604, top module 606, and center module 608. The modular wagering game machine sign 601 can accommodate flat-panel display devices (see 610) of various sizes (e.g., 40 inch, 46 inch, and 52 inch displays).

Figure 6B:
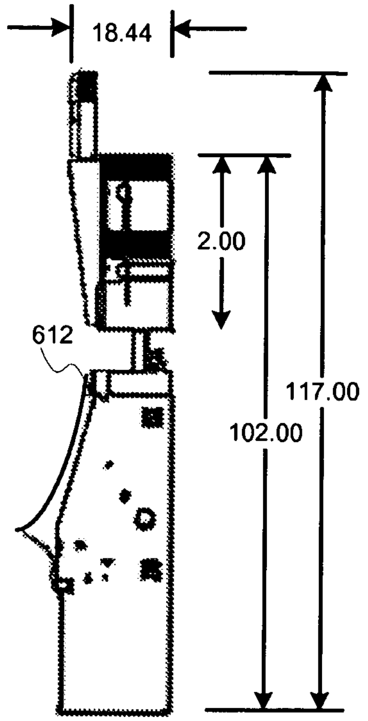
FIG. 6B illustrates a side view of the wagering game machine bank 600.

As shown, the bank 600 is 112 inches wide. The center module is 51.2 inches long, while the entire sign 601 is 105 inches long. FIG. 6B illustrates a side view of the wagering game machine bank 600. As shown, the wagering game machine 612 and the sign 601 are 117 inches tall. The center module is 32 inches tall, while it is 18.44 inches wide. The dimensions of the bank 600 can be modified to accommodate other display sizes and other various size requirements.

Some embodiments of the modular wagering game machine sign can be adapted to accommodate more than one display device. FIG. 7A illustrates a frontal view of a wagering game machine sign including two display devices. The bank 700 includes wagering game machines 712 and a modular wagering game machine sign 701. The modular wagering game machine sign includes a center module 702 large enough to accommodate two display devices, such as dual 40 inch, 46 inch, or 52 inch LCD displays. As shown, the center module is 100.20 inches long, the top module 704 is 51.20 inches long, while the column of wagering game machines 712 is 112 inches long. FIG. 7B illustrates a side view of the bank 700. As shown, the wagering game machine 712 and center module 702 together are 102 inches tall (this does not include the top module 704). Add the top module 704 and the machine 712 and modules are approximately 117 inches tall. The height of the center module itself is 32 inches.

In some embodiments, only center modules are used for housing and/or supporting display devices. However, in some instances, other modules are used in concert with the center module to house and/or support display devices. FIG. 7C is an isometric view of modular wagering game machine sign in which a plurality of modules house a plurality of display devices. The modular wagering game machine sign 725 includes a center module 720, left module 724, and right module 722. As shown, the modules 720, 722, & 724 all house the display devices 726. The modules can connect together as described above, or they can employ other means for assembly. Although not shown, other modules (e.g., a top module) can be added to the sign 700.

Viewing Angles

Figure 8A:
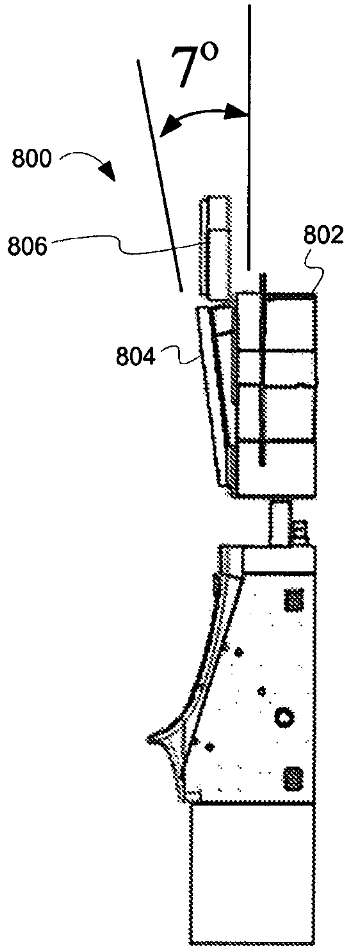
FIG. 8A is a side view of the modular wagering game machine sign that can hold a display device at different viewing angles.

FIG. 8A is a side view of the modular wagering game machine sign that can hold a display device at different viewing angles. The sign 800 includes a center module 802, a top module 806, and the display device 804. The sign can also include other modules.

Figure 8B:
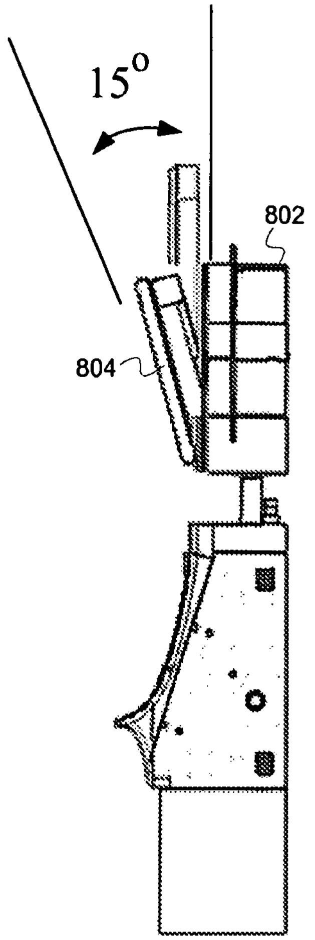
FIG. 8B shows the center module 802 holding the display device 804 and a 15° angle.

The center module 802 includes means for supporting different viewing angles of the display device 804. As shown, the center module 802 is holding the display device 804 at a seven degree angle. The display device 804 can move in a range of suitable viewing angles. Thus, field technicians can adjust the viewing angle as needed. FIG. 8B shows the center module 802 holding the display device 804 and a 15° angle. The center module 802 can hold the display device 804 at any suitable viewing angle.

In addition to changing the viewing angle, the center module can include components for rotating a display device upward to allow field technicians to access components inside the center module. The discussion of FIGS. 9A and 9B describe this in more detail.

Figure 9A:
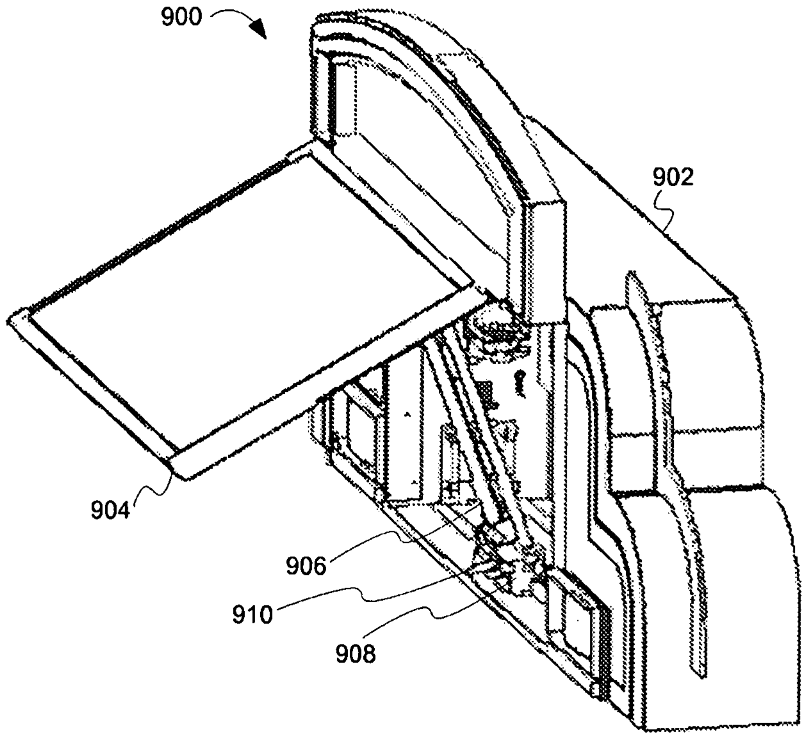
FIG. 9A is an isometric view of a modular wagering game machine sign capable of rotating a display device to allow access to components inside the sign.
Figure 9B:
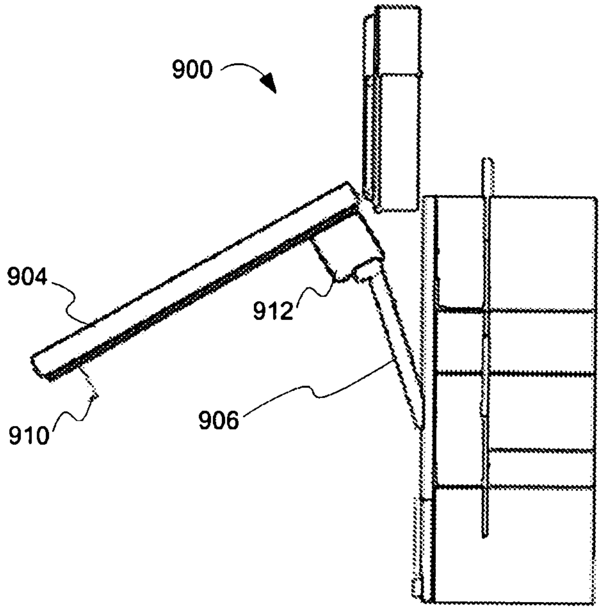
FIG. 9B shows a side view of the modular wagering game machine sign 900.

FIG. 9A is an isometric view of a modular wagering game machine sign capable of rotating a display device to allow access to components inside the sign. The center module 902 includes components for rotating the display device 902 to an "up" position, exposing the center module's innards. The components include a latch 910, hinge 908, and support bar 906. The latch 908 can mate with a coupling (see FIG. 9B) on the display device 904. The display device 904 can be released from a "locked" position by the latch 910. The display device 904 can be held in an "up" position using a prop bar (not shown). Because removal of the display device 904 is not required to access components inside the center module 902, a single technician can maintain the sign. FIG. 9B shows a side view of the modular wagering game machine sign 900. As noted above, the display device 904 can include a coupling that mates with the latch 910. The support bar 906 can be connected to a hinge 912 that is fastened to the display device 904. In some embodiments the hinges 912 and 908 can lock, holding the display device 904 in the "up" position without needing a prop bar.

Instead of rotating the display device upward, some embodiments horizontally rotate the display device. The discussion of FIGS. 10A-10C describes this in more detail.

Figure 10A:
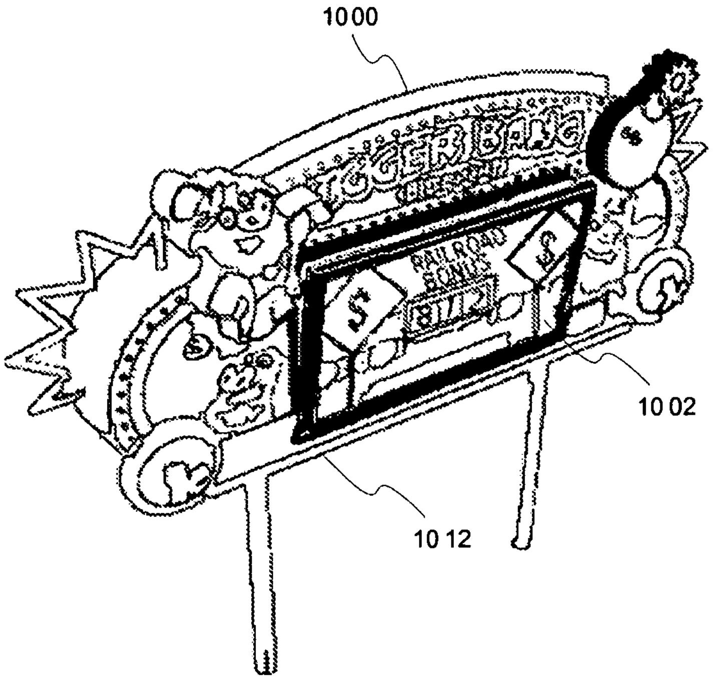
FIG. 10A is an isometric view of a modular wagering game machine sign capable of rotating a display device, according to some embodiments of the invention.

FIG. 10A is an isometric view of a modular wagering game machine sign capable of horizontally rotating a display device, according to some embodiments of the invention. In FIG. 10A, a sign 1000 includes a display device 1002. In FIG. 10A, the display device 1002 is in its "home" position (i.e., the display device 1002 not rotated away from the sign's main structure). FIG. 10A also shows how some embodiments of the modular wagering game sign can include a platform 1012 configured to support one or more of the sign's modules.

Figure 10B:
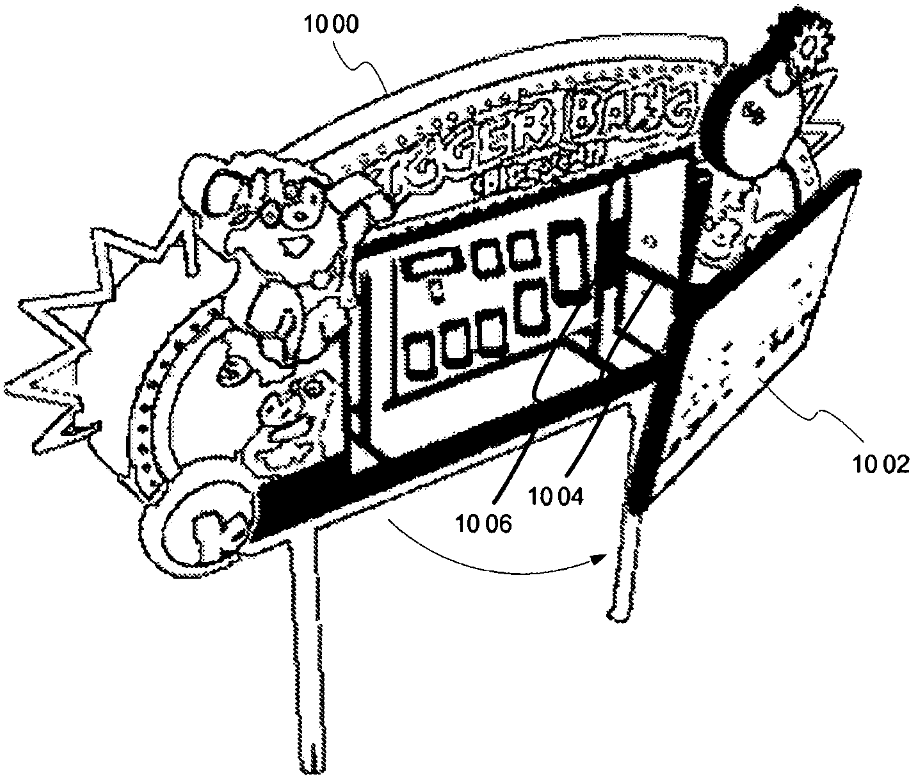
FIG. 10B is an isometric view of the modular sign 1000 with its display device 1002 horizontally rotated.

FIG. 10B is an isometric view of the modular sign 1000 with its display device 1002 is horizontally rotated. In FIG. 10B, the sign 1000 includes a swing arm 1004 connected to a support member 1006. As shown, the swing arm 1004 rotates (e.g., via a hinge) in the horizontal plane. Thus, the swing arm 1004 allows the display device 1002 to horizontally rotate away from the sign's main structure, exposing electronic components (e.g., circuit boards, wires, etc.) that reside inside the sign's center module. Because the swing arm 1004 supports and moves the display device 1002, a single repair technician can move the display device 1002 to service the electronics inside the sign's center module. In some embodiments, the swing arm 1004 can include a coupling that pivots the display device after the display device is rotated away from the sign's main structure.

In some embodiments, the swing arm 1004 includes additional components that prevent it from rotating during installation of the display device 1002. For example, the swing arm 1004 may include a latch or other components that connect it to a panel or support member, preventing it from rotating when a technician is installing the display device 1002. In other embodiments, a separate device is connected to the swing arm 1004 to immobilize it during display device installation.

Figure 10C:
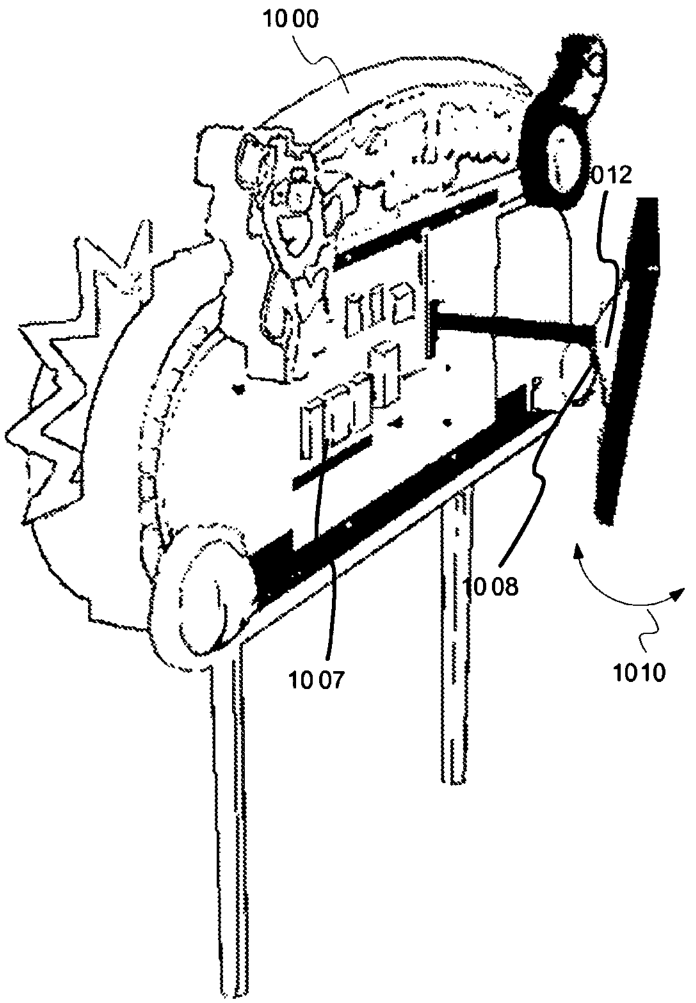
FIG. 10C is an isometric view showing an embodiment of the swing arm including a pivoting coupling.

FIG. 10C is an isometric view showing an embodiment of the swing arm including a pivoting coupling. As shown, the display device 1002 has been horizontally rotated away from the sign's main structure. A pivoting coupling 1008 includes a pin 1012, whereby the display device 1002 can rotate about the pin 1012 (see arrow 1010). Additionally, the coupling includes a hinge or other connection that allows the display device 1002 to further rotate in the horizontal plane (i.e., to rotate about the hinge's pin).

Cutouts

Figure 11A:
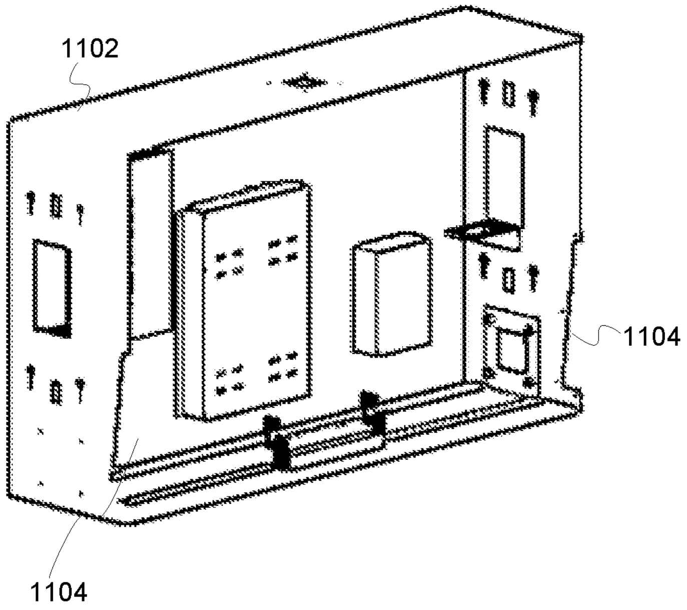
FIG. 11A shows an isometric view of a center module including cutouts.
Figure 11B:
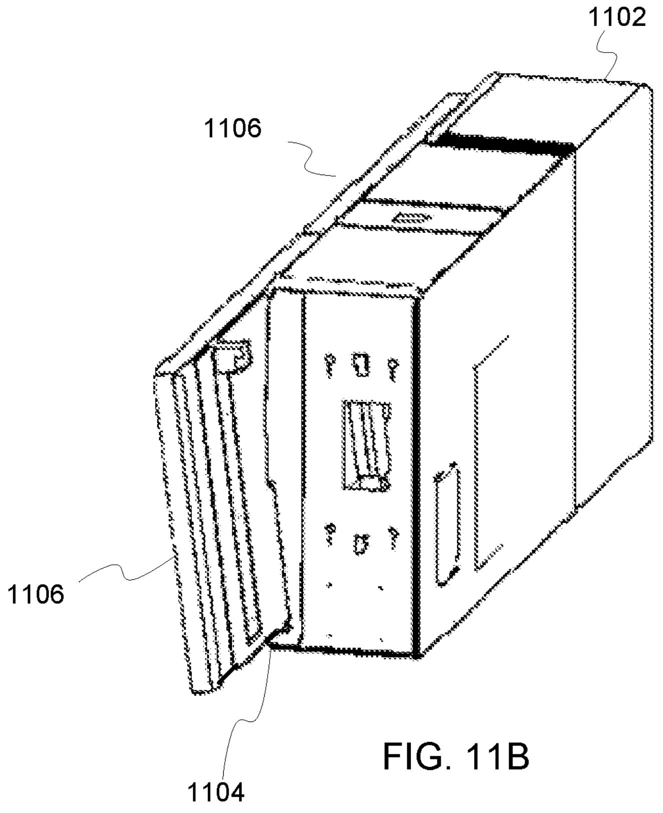
FIG. 11B shows an isometric view of a center module with cutouts supporting display devices.

As discussed above, the center module itself can house a sign's display devices or a plurality of modules may house the display devices. In instances where multiple modules house a sign's display devices, the center module may include cutouts to accommodate the display devices. FIG. 11A shows an isometric view of a center module including cutouts. In FIG. 11A, the center module 1102 includes cutouts 1104. The cutouts 1104 make space to accommodate display devices that span across the entire center module 1102. FIG. 11B shows an isometric view of a center module with cutouts supporting display devices. In FIG. 11B, the center module 1102 is supporting and housing the display devices 1106. The center module 1102 can hold the display devices 1106 using the components described above.

Frames, Lighting, Couplings, Etc

Frames & Lighting

Figure 12A:
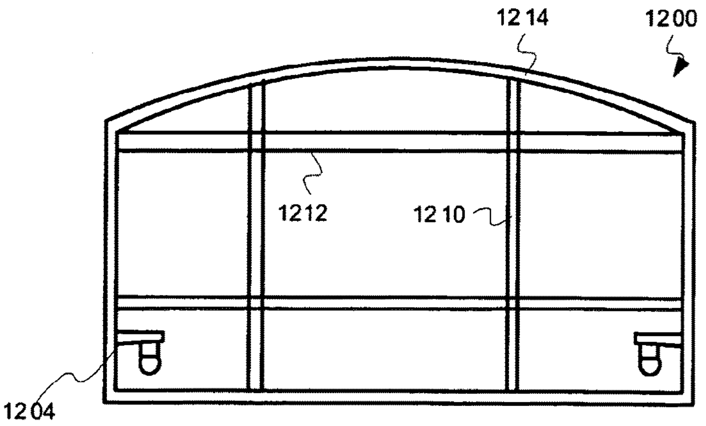
FIG. 12A illustrates a frame for a center module of a modular wagering game sign.

FIG. 12A illustrates a frame for a center module of a modular wagering game sign. In FIG. 12A, a frame 1200 includes a plurality of vertical support members 1210 and horizontal support members 1212. As shown, the frame 1200 also includes a contoured support member 1214, giving the frame 1200 an arched top. The frame 1200 can be constructed of tubular aluminum. Alternatively, the frame 1200 can be constructed of steel, plastic, wood, or any other suitable material. Quick-release couplings 1204 are attached to two vertical support members. The discussion below will describe how quick-release couplings can receive auxiliary sign supports and other hardware.

Figure 12B:
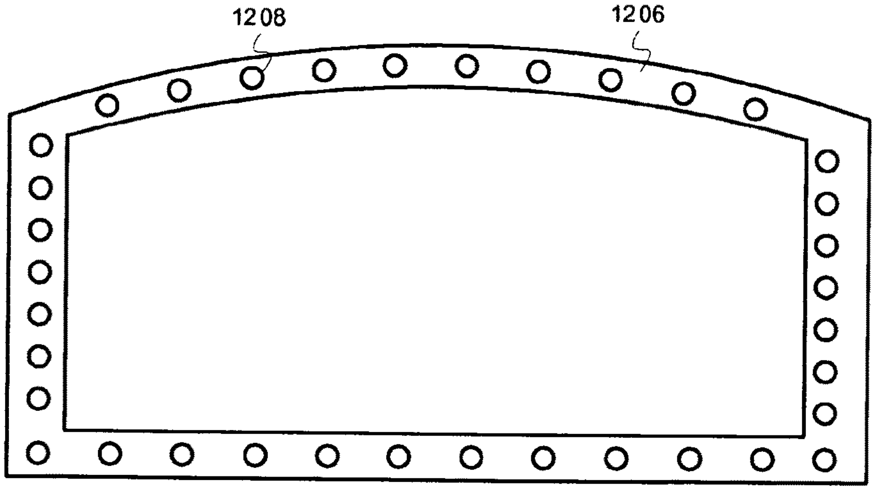
FIG. 12B illustrates a lighted faceplate.
Figure 12D:
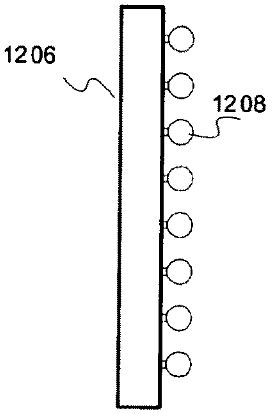
FIG. 12D illustrates a side view of the lighted faceplate 1206.
Figure 12C:
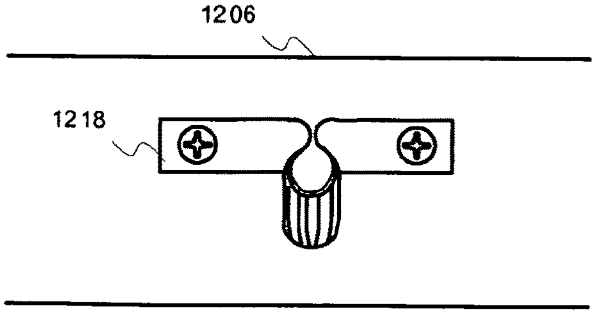
FIG. 12C is an isometric illustration of a snap-in fastener that can couple a modular sign's faceplate to its frame.

In some embodiments, faceplates and other panels can mount on the frame 1214. FIG. 12B illustrates a lighted faceplate. In FIG. 12, the faceplate 1206 is shaped to fit over the frame 1200. The faceplate 1206 can include snap-in type fasteners, sliding latches, hand-turnable screws, etc. that mate with holes or other couplings of the frame 1200. FIG. 12C is an isometric illustration of a snap-in fastener that can couple a modular sign's faceplate to its frame. In FIG. 12C, the snap-in fastener 1218 is mounted on a section of the faceplate 1206. The snap-in fastener 1218 includes a rigid contoured body that snaps-in to a coupling on the frame (not shown). The frame's coupling can include a rubber grommet pressed into a hole in the frame, a U-shaped band that expands to receive the snap-in fastener 1218, or other suitable components. Thus, technicians can install/remove the faceplate 1206 on/off the frame 1200 without needing tools (e.g., wrenches, screwdrivers, etc.).

As shown, the faceplate 1206 includes lighting units 1208. FIG. 12D illustrates a side view of the lighted faceplate 1206. In some embodiments, each lighting unit 1208 includes a light emitting diode (LED) and a globe. The globes allow the lighting units 1208 to appear as traditional light bulbs, and the globes distribute light from the LEDs. In some embodiments, the globes can be constructed of acrylic, plastic, or other suitable material, and they can be scored to refract light. The globes can be hollow or solid. In some embodiments, the hollow globes can be vacuum formed or ejection molded plastic.

In some embodiments, the lighting unit's LEDs are wired to a printed circuit board that includes a microprocessor and other computing components (e.g., a flash memory device including software, Ethernet card, etc.). As a result, the lighting units 1208 can be selectively activated to coordinate with wagering game machines or other casino devices. For example, a modular sign's lighting units can present an attract mode light sequence in coordination with nearby wagering game machines. Furthermore, in some embodiments, wagering game machines can present bonus game content on a sign, instead of using the machine's display device(s). For example, a wagering game can present a light sequence and video content on the sign's lighting units and display device.

Couplings

Figure 13:
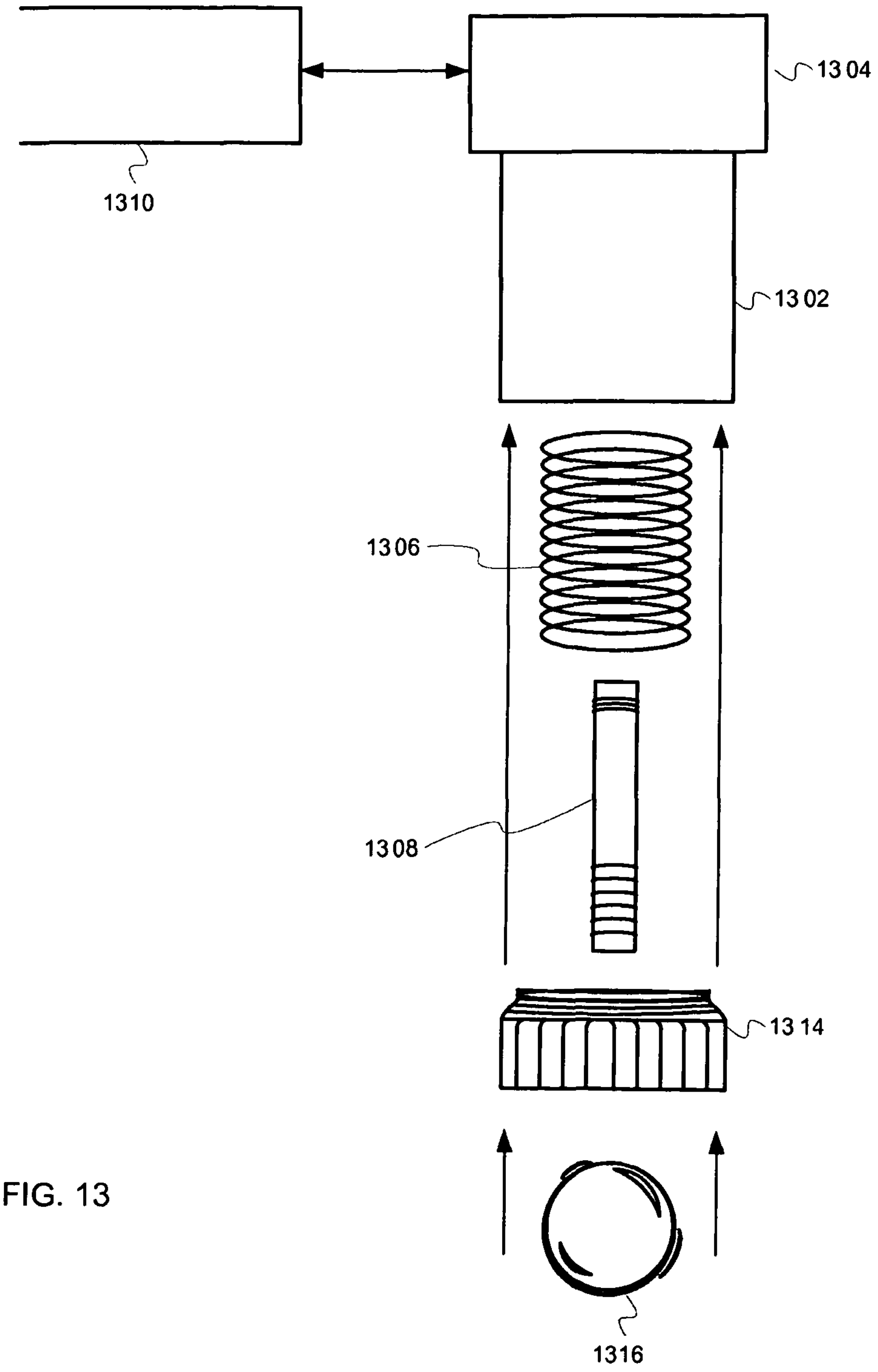
FIG. 13 illustrates an exploded view of a quick-release coupling, according to some embodiments of the invention.

As noted above, some embodiments include quick-release couplings. FIG. 13 illustrates an exploded view of a quick-release coupling, according to some embodiments of the invention. As shown, the quick-release coupling 1300 includes a housing 1302 connected to a receiver 1304. The housing 1302 encapsulates a spring 1306 and pin 1308, forming a spring-actuated pin mechanism. The receiver 1304 is tubular and configured to receive auxiliary hardware (e.g., for supporting auxiliary signs, marquees, etc.). When the receiver 1304 receives auxiliary hardware 1310, the spring-actuated pin is configured so the pin 1308 telescopes into a hole in auxiliary hardware 1310, holding it fast in the receiver 1304.

The housing 1302 can include threads for coupling with a retention nut 1314. The pin 1308 can pass through the retention nut 1314 and mate with a handle 1316. In some embodiments, the housing 1302 contains additional washers, fasteners, or other hardware for coupling the spring 1306 and pin 1308, and achieving spring-actuation of the pin 1308. In some embodiments, the housing 1302 can be cylindrical, while the receiver 1304 can squared. The quick-release coupling's components can include any suitable materials, such as metals, plastics, rubbers, etc. The discussion below describes more ways quick-release couplings can be used with modular wagering game machine signage.

Figure 14A:
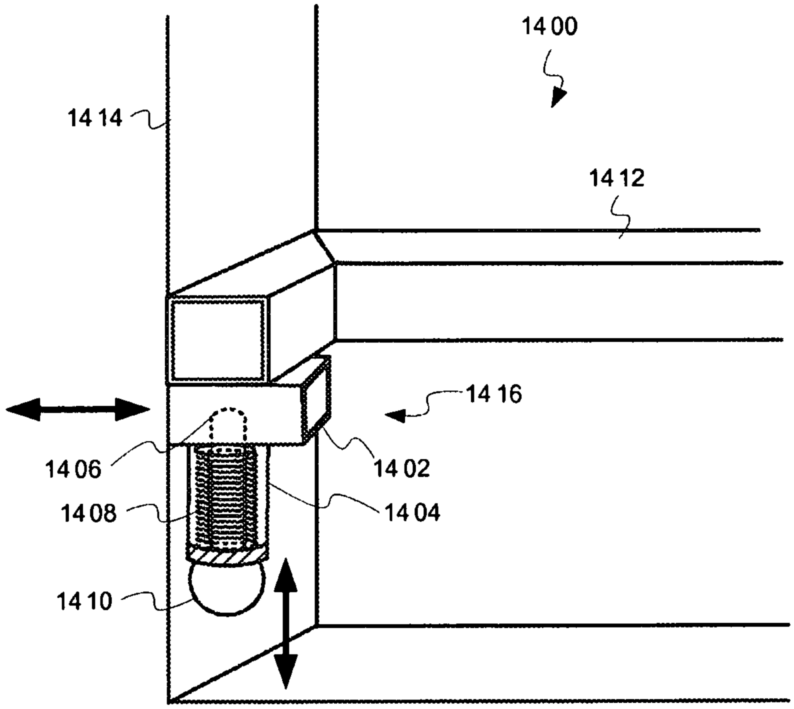
FIG. 14A is an isometric illustration of a quick-release coupling mounted inside a wagering game sign module, according to some embodiments of the invention.

FIG. 14A is an isometric illustration of a quick-release coupling mounted inside a wagering game sign module, according to some embodiments of the invention. FIG. 14A shows a portion of a wagering game sign module 1400. The module 1400 includes a frame support member 1412 and a partial enclosure 1414. For clarity, other sections of the sign's enclosure and other frame support members are not shown. As shown, a quick-release coupling 1416 is mounted to an underside of the support member 1412. The quick-release coupling 1416 includes a receiver 1402, housing 1404, and handle 1410. The housing encloses a spring 1408 and pin 1406.

Figure 14B:
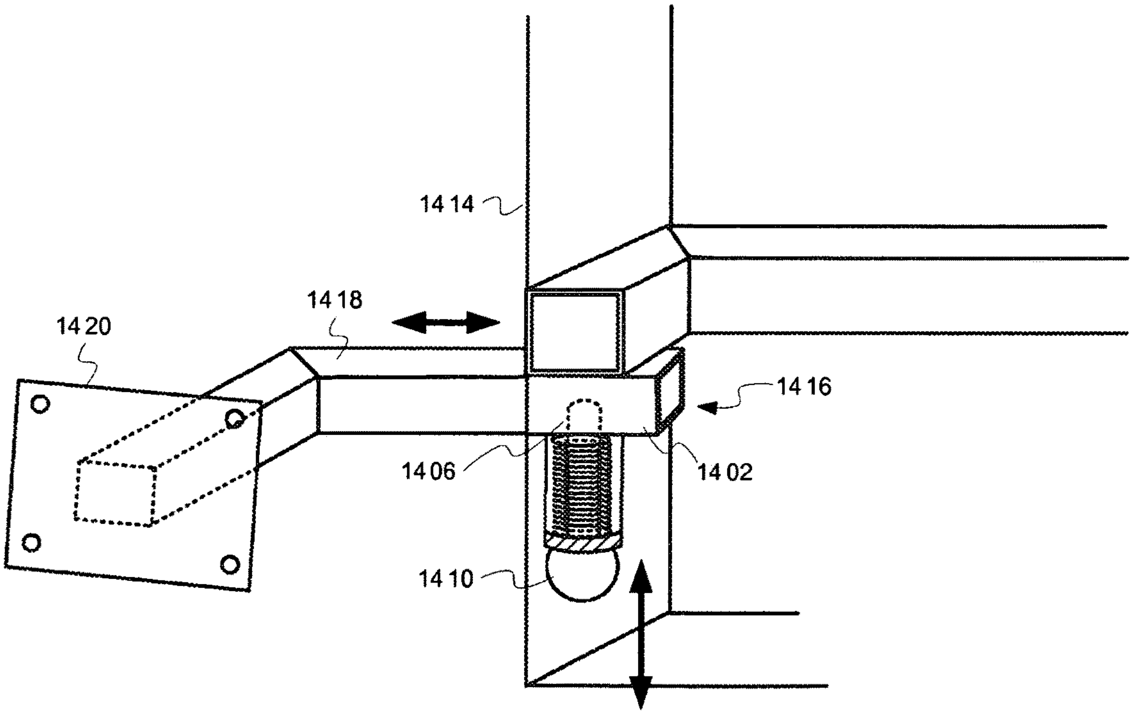
FIG. 14B shows a portion of a wagering game sign module 1400.

The enclosure 1414 includes a cutout (not shown) through which the receiver 1402 can receive hardware for supporting an auxiliary sign. FIG. 14B describes this in more detail. FIG. 14B is an isometric illustration of a quick-release coupling holding an auxiliary sign mount, according to some embodiments of the invention. In FIG. 14B, the quick-release coupling 1416 has received an auxiliary sign mount 1418 in its receiver 1402. The auxiliary sign mount 1418 includes a plate 1420 onto which auxiliary signage can be mounted. The plate 1420 can include holes, studs, or other components for mounting auxiliary signs. The auxiliary signs can be plastic molded signs, sheet metal signs, etc.

A technician can slide the auxiliary sign mount 1418 through a cutout in the enclosure 1414 and into the quick-release coupling's receiver 1402. To lock the mount 1418 into place, the technician can pull down on the handle 1410 and push the mount 1418 into the receiver 1402 until the pin 1406 springs into a pinhole in the mount 1418. The technician can remove the auxiliary sign mount 1418 by releasing the pin 1406 (i.e., pulling the handle 1410) and pulling the mount 1418 from the receiver 1402.

Figure 15:
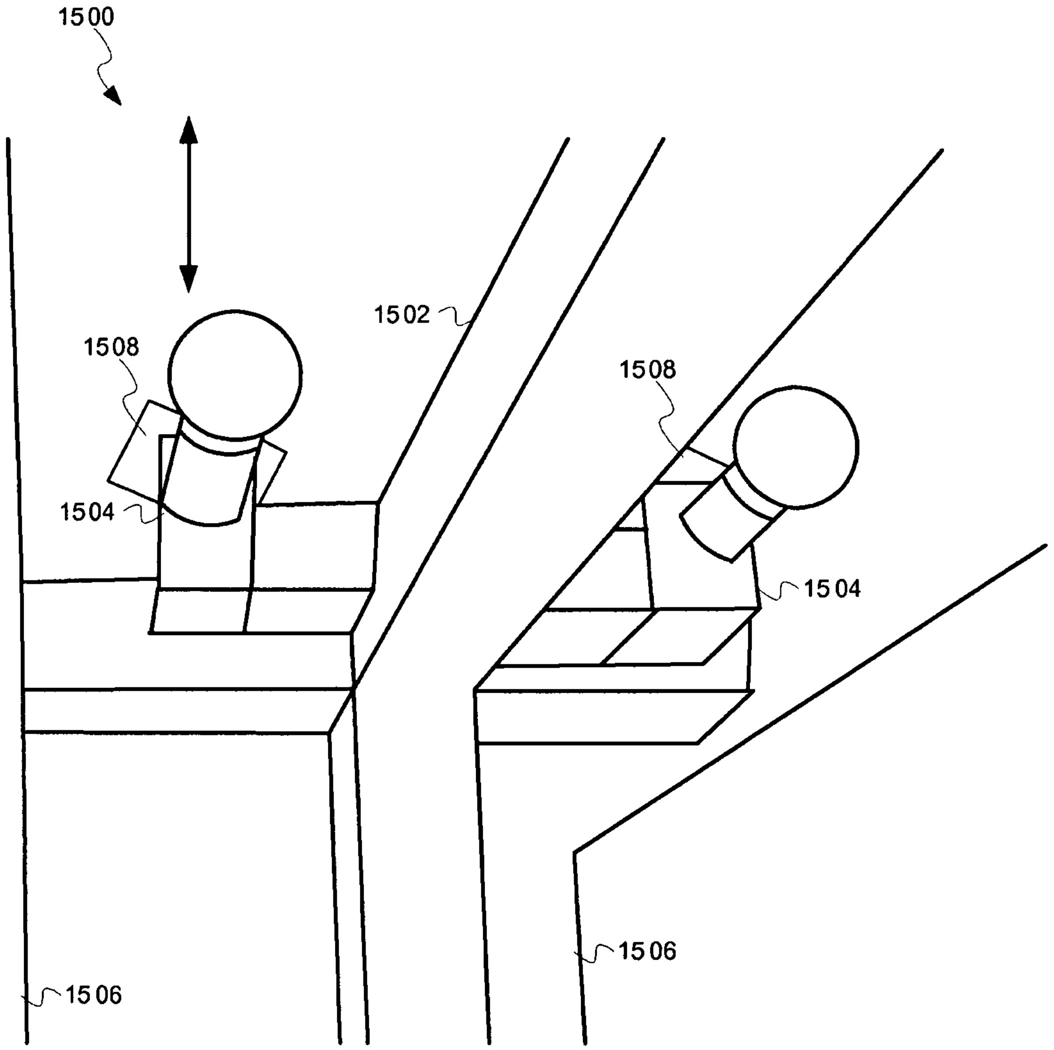
FIG. 15 is an isometric illustration showing quick-release couplings configured to support a marquee, according to some embodiments of the invention.

FIG. 15 is an isometric illustration showing quick-release couplings configured to support a marquee, according to some embodiments of the invention. FIG. 15 shows a portion of a wagering game machine sign module 1500. As shown, the module 1500 includes frame support members and enclosure panels 1506. Quick-release couplings 1504 are mounted on opposing sides of a support member 1502. The support member's top surface provides support for an enclosure panel that makes-up the sign module's top outer surface. The quick-release couplings 1504 are mounted so their receivers can receive marquee mounts (similar to auxiliary sign mounts) through cutouts 1508 in the enclosure panel. The marquee will stand above the module 1500 (see FIG. 16). As shown, each of the quick-release couplings 1504 is configured to work in conjunction with another quick-release coupling mounted on the module's other side (not shown). As a result, the module 1500 includes fours quick-release couplings and is configured to support two marquees. Modules can be configured to support any number of marquees.

Technicians can install marquees over the sign module 1500 by releasing the quick-release coupling's pins and sliding the marquee support hardware into the receivers 1504 (as described above). They can reverse to process to remove the marquee. As such, no tools are needed to install/remove the marquee.

Figure 16:
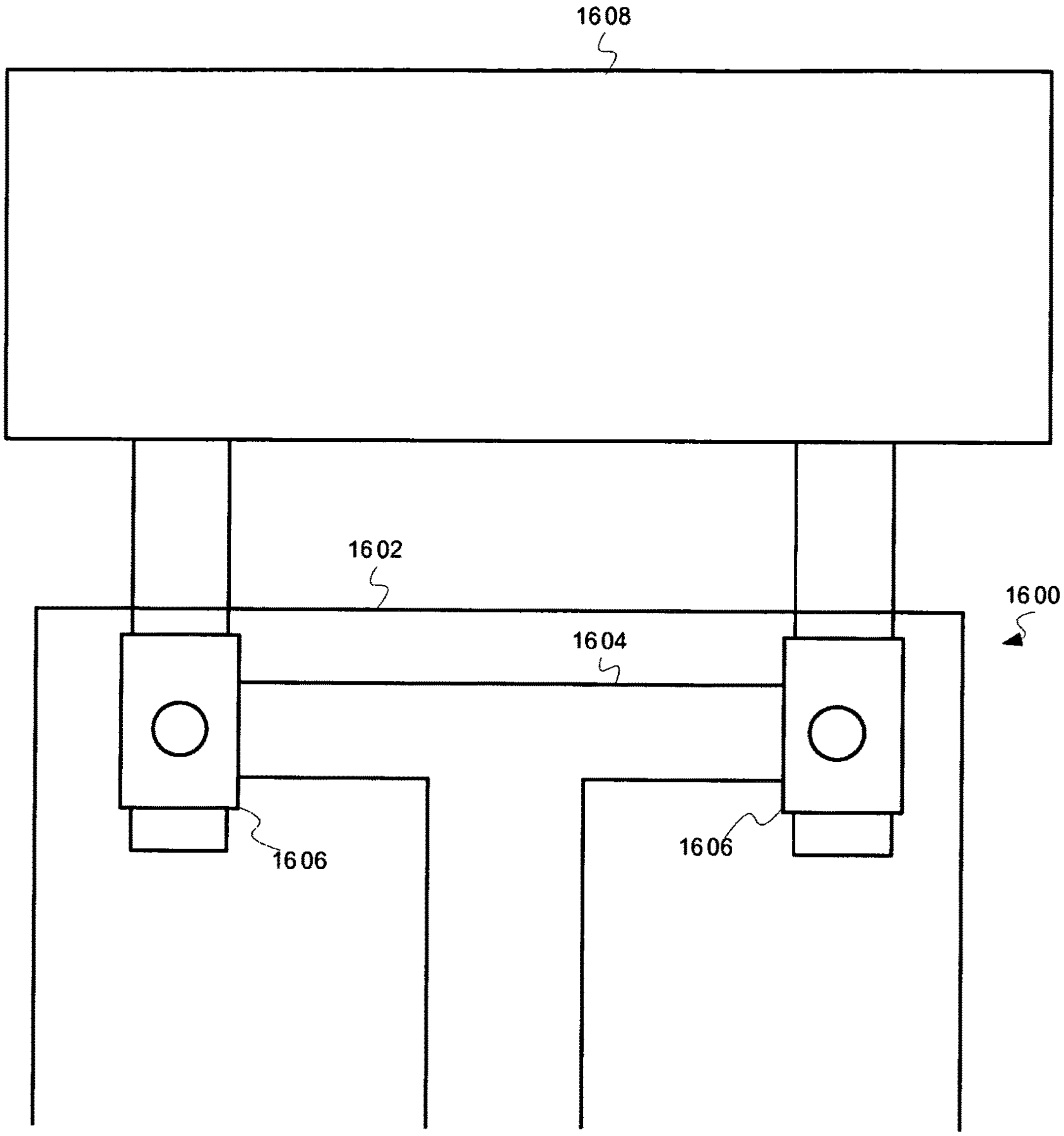
FIG. 16 shows a wagering game sign module supporting a marquee, according to some embodiments of the invention.

FIG. 16 shows a wagering game sign module supporting a marquee, according to some embodiments of the invention. In FIG. 16, the wagering game sign module 1600 includes a frame 1604 and an enclosure 1602. Two quick-release couplings 1606 are connected to the frame 1604. As shown, the quick-release couplings 1606 are oriented so they can receive marquee mounts through a top surface of the enclosure 1602. The frame 1604 and quick-release couplings 1606 hold the marquee 1608 above the sign module 1600. The marquee 1608 is an auxiliary sign that can include lighting, artwork, and other components for conveying information and attracting attention.

Latches

Figure 17A:
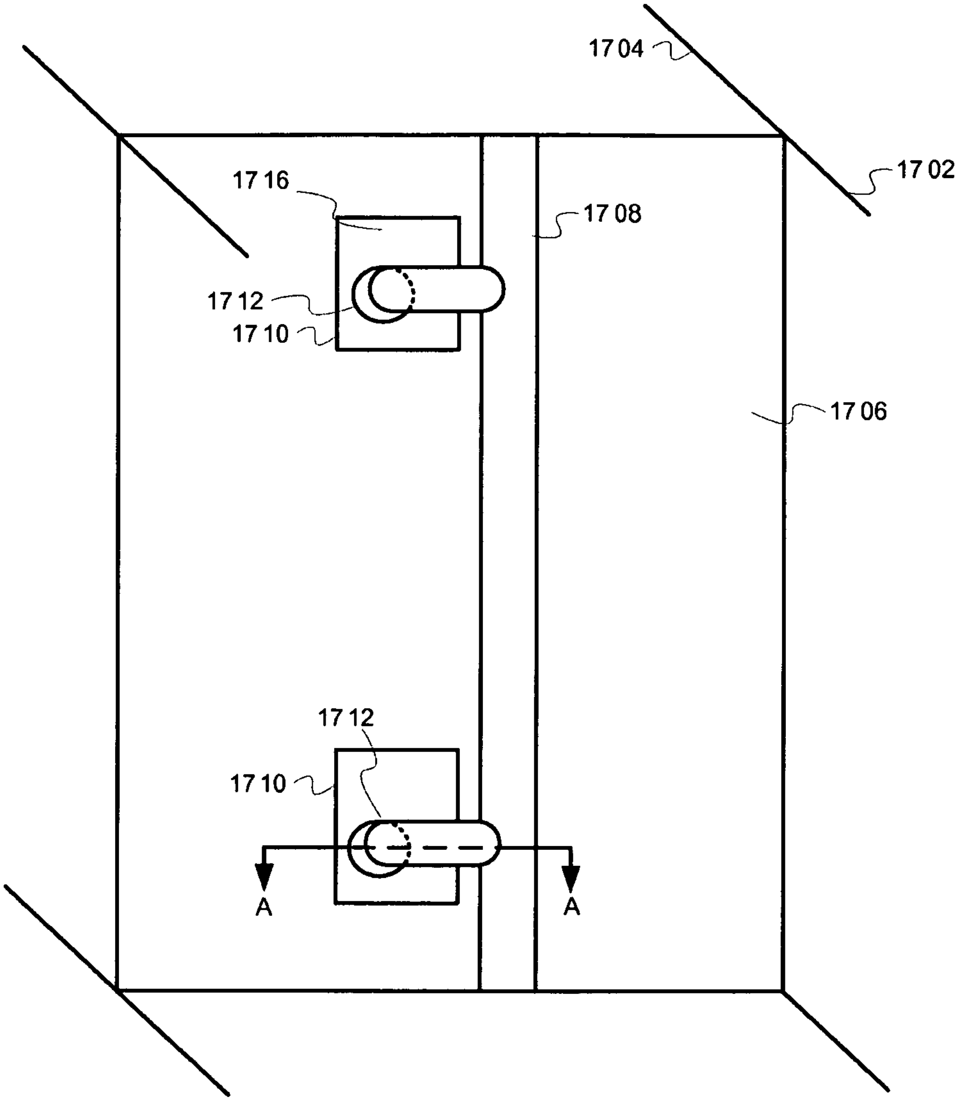
FIG. 17A is an isometric illustration showing two sign modules connected using latches, according to some embodiments of the invention

Some embodiments of the modular wagering game machine sign can connect modules using fasteners that do not require tools. For example, the modular sign can use hand-spinning latches for connecting side modules to the center module. FIG. 17A is an isometric illustration showing two sign modules connected using latches, according to some embodiments of the invention. FIG. 17A shows a partial view of a center module 1704 and a side module 1702. While each module can include a frame (as described above), only one support member 1708 is shown in FIG. 17A. The side module's side panel 1706 includes cutouts 1710 through which the center module's latches 1712 can pass and press snuggly against the support member 1708, holding the side module 1702 to the center module 1704.

Figure 17B:
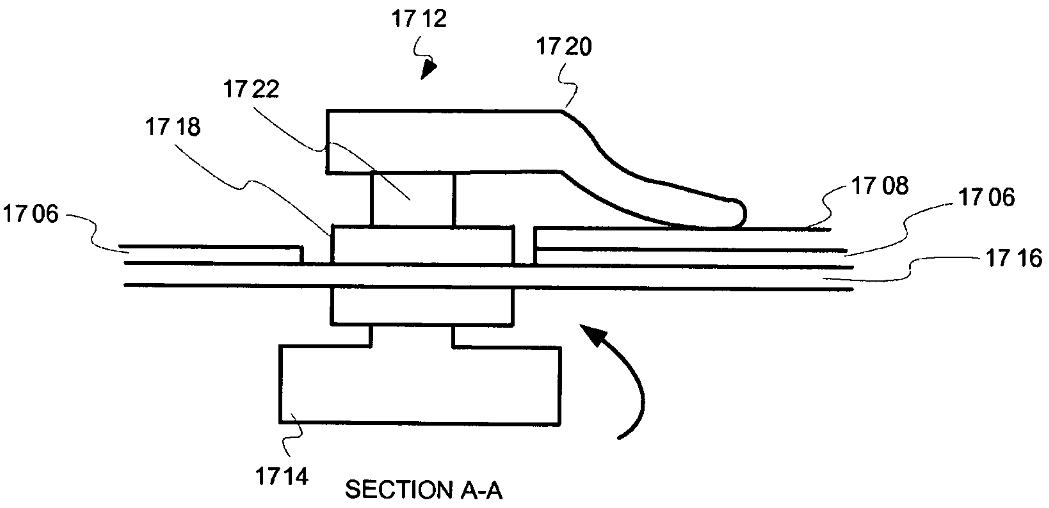
FIG. 17B shows a sectional view of the latch 1712 and sign modules.

FIG. 17B shows a sectional view of the latch 1712 and sign modules. As shown in FIG. 17B, the latch 1712 is connected to the center module's side panel 1716 via retainers 1718. The latches' head 1720 is pressed against the support member 1708. A technician can disengage the latch head 1720 from the support member 1718 by twisting the handle 1714. After the latch 1712 is disengaged from the support member 1708, the technician can separate the sign modules. As such, the technician does not need tools to separate the sign modules. In some embodiments, the handle 1714 resembles a wing-nut.

Electronics and Lighting

Figure 18:
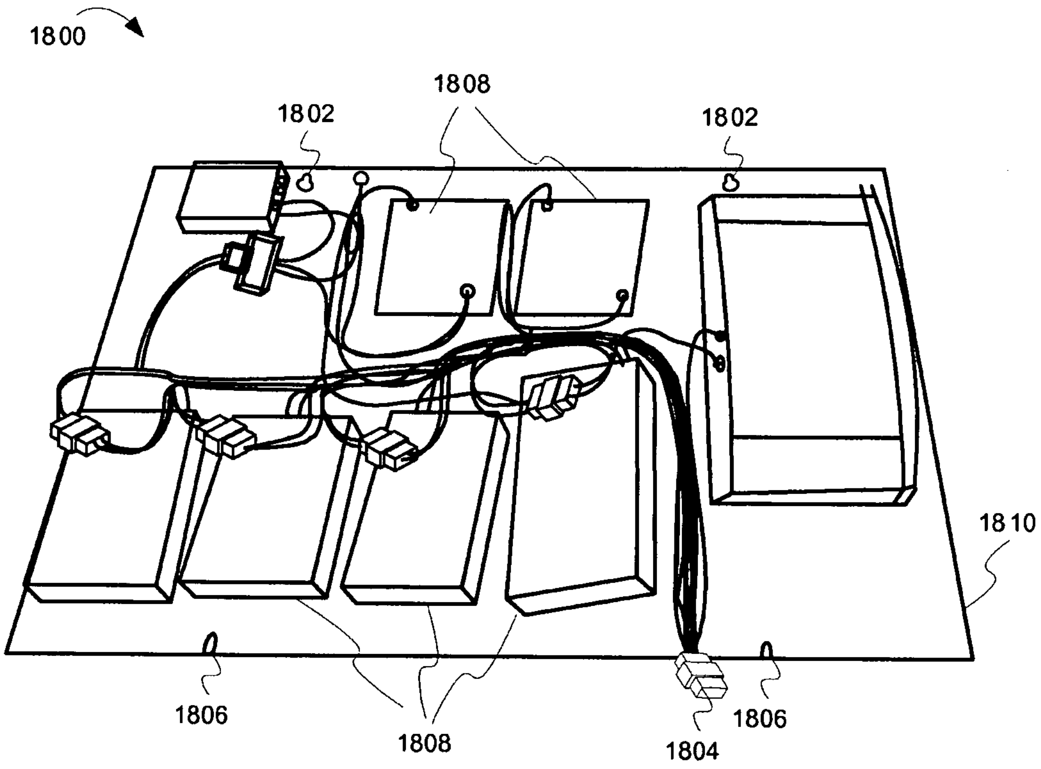
FIG. 18 is an isometric illustration showing a modular component board for installation in a modular wagering game sign, according to some embodiments of the invention.

In some embodiments, the modular wagering game sign includes modular component boards configured for easy installation and removal. As noted above, some sign modules can include numerous electronic components (see FIGS. 9A-10C). These electrical components can be mounted on a modular component board. The electronic components can include printed circuit boards, power components, audio/video components, etc. FIG. 18 shows some features of the modular component boards.

FIG. 18 is an isometric illustration showing a modular component board ready for installation in a modular wagering game sign, according to some embodiments of the invention. As shown, a plurality of electronic components 1808 are mounted to the modular component board 1800. The electronic components can be fastened to the board 1800 using straps, brackets, cages, etc. along with fasteners (e.g., thumb screws). In some embodiments, the component board's backing can resemble a "peg board", having holes distributed across its surface. In such an embodiment, the components can be coupled to the backing using hook-type brackets that mate with holes in the backing. The hook-type brackets can be installed by hand without special tools. The cabling for the electronic components converges into a single master plug 1804 that connects the board's components to other electronics in the modular sign. The board 1800 includes eyelets 1802 and slots 1806 for hanging the board 1800 on a modular sign's frame.

A technician can install the modular component board 1800 by hanging it on pegs mounted on frame support members. The board's eyelets and slots (1802 & 1806) can rest on the frame's pegs and hold the modular component board 1800 in place inside a sign module. The pegs can include caps that fit through the eyelets, retaining the board as it slides into place. After hanging the board 1800 in the module, the technician need only connect the master plug 1804 for the electronic components to operate. As such, the technician can install or replace modular component boards without using tools.

Figure 19:
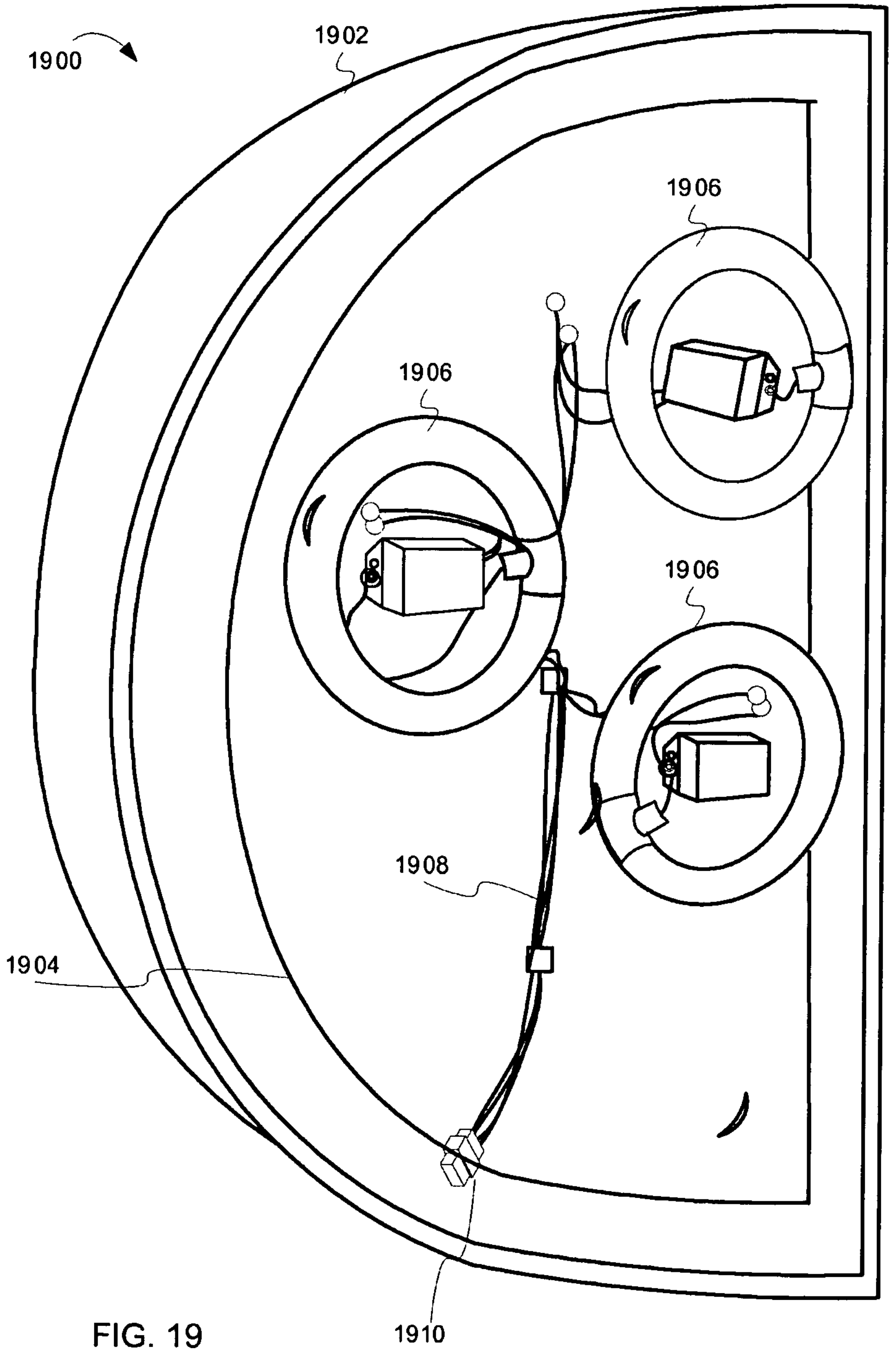
FIG. 19 is an isometric illustration of a modular lighting panel, according to some embodiments of the invention.

FIG. 19 is an isometric illustration of a modular lighting panel, according to some embodiments of the invention. In FIG. 19, the modular lighting panel 1900 appears in a side module 1902. As shown, the lights 1906 are circular florescent lights, but can be any suitable shape and lighting type (e.g., incandescent, LED, etc.). The lights' wiring 1908 can converge into a single plug 1910. In some embodiments, the lights 1906 are mounted on a backing 1904, which can include eyelets, slots, holes, or other facilities by which it mounts inside a sign module (e.g., to support members). In some embodiments, the panel's backing 1904 is constructed of a translucent material (e.g., clear plexiglass) to reduce shadowing if the sign is double-faced (see discussion below). The modular lighting panel can be configured to work with center modules and various shapes.

Double-Faced Signs

Any of the modular signs described above can include two faces. For example, a center module can include artwork, lighting, and other display material on both front and back sides. In some embodiments, for a center module to present content on two sides, the center module can include two modular component boards, two swing arms, two display devices, etc.

Wagering Game Machines

Figure 20:
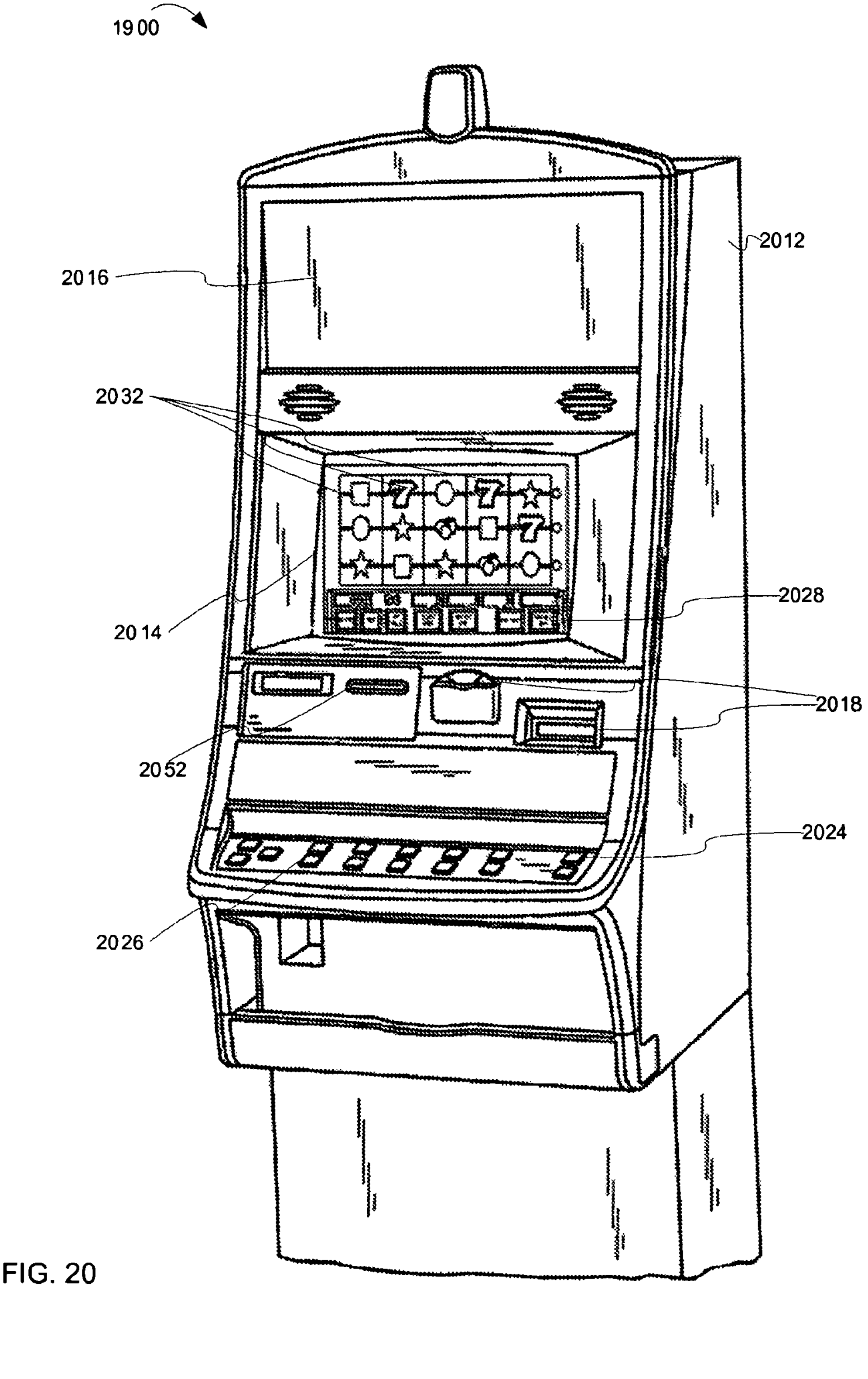
FIG. 20 is a perspective view of a wagering game machine, according to example embodiments of the invention

FIG. 20 is a perspective view of a wagering game machine, according to example embodiments of the invention. Referring to FIG. 20, a wagering game machine 2000 is used in gaming establishments, such as casinos, and in conjunction with modular wagering game machine signage. According to embodiments, the wagering game machine 2000 can be any type of wagering game machine and can have varying structures and methods of operation. For example, the wagering game machine 2000 can be an electromechanical wagering game machine configured to play mechanical slots, or it can be an electronic wagering game machine configured to play video casino games, such as blackjack, slots, keno, poker, blackjack, roulette, etc. Furthermore, the wagering game machine 2000 can be suitable for operating with one or more modular wagering game machine signs.

The wagering game machine 2000 comprises a housing 2012 and includes input devices, including value input devices 2018 and a player input device 2024. For output, the wagering game machine 2000 includes a primary display 2014 for displaying information about a basic wagering game. The primary display 2014 can also display information about a bonus wagering game and a progressive wagering game. The wagering game machine 2000 also includes a secondary display 2016 for displaying wagering game events, wagering game outcomes, and/or signage information. While some components of the wagering game machine 2000 are described herein, numerous other elements can exist and can be used in any number or combination to create varying forms of the wagering game machine 2000.

The value input devices 2018 can take any suitable form and can be located on the front of the housing 2012. The value input devices 2018 can receive currency and/or credits inserted by a player. The value input devices 2018 can include coin acceptors for receiving coin currency and bill acceptors for receiving paper currency. Furthermore, the value input devices 2018 can include ticket readers or barcode scanners for reading information stored on vouchers, cards, or other tangible portable storage devices. The vouchers or cards can authorize access to central accounts, which can transfer money to the wagering game machine 2000.

The player input device 2024 comprises a plurality of push buttons on a button panel 2026 for operating the wagering game machine 2000. In addition, or alternatively, the player input device 2024 can comprise a touch screen 2028 mounted over the primary display 2014 and/or secondary display 2016.

The various components of the wagering game machine 2000 can be connected directly to, or contained within, the housing 2012. Alternatively, some of the wagering game machine's components can be located outside of the housing 2012, while being communicatively coupled with the wagering game machine 2000 using any suitable wired or wireless communication technology.

The operation of the basic wagering game can be displayed to the player on the primary display 2014. The primary display 2014 can also display a bonus game associated with the basic wagering game. The primary display 2014 can include a cathode ray tube (CRT), a high resolution liquid crystal display (LCD), a plasma display, light emitting diodes (LEDs), or any other type of display suitable for use in the wagering game machine 2000. Alternatively, the primary display 2014 can include a number of mechanical reels to display the outcome. In FIG. 20, the wagering game machine 2000 is an "upright" version in which the primary display 2014 is oriented vertically relative to the player. Alternatively, the wagering game machine can be a "slant-top" version in which the primary display 2014 is slanted at about a thirty-degree angle toward the player of the wagering game machine 2000. In yet another embodiment, the wagering game machine 2000 can exhibit any suitable form factor, such as a free standing model, bartop model, mobile handheld model, or workstation console model.

A player begins playing a basic wagering game by making a wager via the value input device 2018. The player can initiate play by using the player input device's buttons or touch screen 2028. The basic game can include arranging a plurality of symbols along a payline 2032, which indicates one or more outcomes of the basic game. Such outcomes can be randomly selected in response to player input. At least one of the outcomes, which can include any variation or combination of symbols, can trigger a bonus game.

In some embodiments, the wagering game machine 2000 can also include an information reader 2052, which can include a card reader, ticket reader, bar code scanner, RFD transceiver, or computer readable storage medium interface. In some embodiments, the information reader 2052 can be used to award complimentary services, restore game assets, track player habits, etc.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A modular wagering game machine sign configured for placement above one or more wagering game machines, wherein the modular wagering game sign includes a plurality of modules that can be assembled without tools, the modular wagering game machine sign including:
- a center module including,
  - a plurality of support members forming a frame;
  - at least one outer panel including indicia about a wagering game available on the wagering game machines, the at least one outer panel covering the frame;
  - a lighted faceplate including lighting units, wherein each lighting unit includes,
    - a light emitting diode (LED); and
    - a globe enveloping the LED;
- at least one side module detachably connected to the center module, the at least one side module including,
  - one or more hand-spinning latches including,
    - a head including a curved member to hold the side module in contact with one or more of the center module's support members;
    - a shaft connected to the head;
    - a handle connected to the shaft, the handle configured to transfer, via the shaft, hand-applied rotational forces to the head to rotate the head into and out of contact with the center module's one or more support members.

2. The modular wagering game machine of claim 1, wherein the globe is a solid mass.

3. The modular wagering game machine of claim 1, wherein the globe is hollow inside.

4. The modular wagering game machine of claim 1, wherein some of the center module's support members include sockets, and wherein the lighted faceplate includes snap-in fasteners configured to detachably sink into the sockets to hold the lighted faceplate to one or more of the center module's support members.

5. The modular wagering game machine of claim 1, wherein the center module includes a swing arm connected to a display device, wherein the swing arm can rotate the display device away from the center module.

6. The modular wagering game machine of claim 5, wherein the swing arm rotates in a horizontal plane.

7. The modular wagering game machine of claim 5, wherein the swing arm rotates in a vertical plane.

8. A modular wagering game sign comprising:
an auxiliary sign;
a sign module including,
a frame covered by an enclosure;
a quick-release coupling mounted on the frame, wherein the quick-release coupling includes a receiver configured to receive the auxiliary sign component, a spring-actuated pin to hold the auxiliary sign component in the receiver, and a handle connected to the spring-actuated pin.

9. The modular wagering game sign of claim 8, wherein the sign module further includes:
a display device; and
a swing arm coupled to the frame and the display device, wherein the swing arm is configured to rotate the display device away from the sign module exposing electronic components.

10. The modular wagering game sign of claim 8, wherein the auxiliary sign component is connected to a marquee mounted above the sign module.

11. The modular wagering game sign of claim 8, wherein the auxiliary sign component is connected to an auxiliary sign oriented beside the sign module.

12. The modular wagering game sign of claim 8, further including:
a platform to support the sign module rest; and
another sign module on the platform, the sign modules coupled hand-spinning via latches.

13. The modular wagering game sign of claim 8, further including:
lighting units including light emitting diodes and globes.

14. The modular wagering game sign of claim 13, wherein the globes are hollow.

15. The modular wagering game sign of claim 13, wherein the globes are solid.

16. A modular wagering game machine sign including:
a master module including,
means for holding a marquee above the master module;
means for mounting electronic components inside the master module;
means for rotating one or more display devices and exposing the electronic components;
at least one auxiliary module connected to the master module, the auxiliary module including,
means for mounting lighting inside the auxiliary module;
means for holding an auxiliary sign in proximity to the auxiliary module;
means for supporting the master module and the at least one auxiliary module; and means for coupling the at least one auxiliary module to the master module.

17. The modular wagering game machine sign of claim 16, wherein the means for rotating the display device includes means for rotating the display device's viewing angle.

18. The modular wagering game machine sign of claim 16, wherein the modular wagering game machine sign includes another master module connected to the master module and the at least one auxiliary module.

19. The modular wagering game machine sign of claim 16 further comprising:
a lighted faceplate coupled to the master module via snap-in connectors, the lighted face plate including means for lighting the faceplate.

20. The modular wagering game machine sign of claim 19, wherein the means for lighting the faceplate is configured to present bonus game content associated with a wagering game machine.

21. The modular wagering game machine sign of claim 16, wherein the means for mounting lighting inside the auxiliary module includes a translucent material.

22. A modular wagering game machine sign to present wagering game information, the modular wagering game machine sign comprising:
a center module including,
mounting slots to receive with one or more other modules;
electrical components mounted inside the center module;
a first electrical connector coupled to the electrical components; and
a video display device connected to the electrical components;
at least one support member connected to the center module to hold the center module above a bank of wagering game machines; and
at least one side module including,
studs to protrude though the slots and connect the side module to the center module;
a second electrical connector configured to connect to the first electrical connector.

23. The modular wagering game machine sign of claim 22, wherein the center module further includes a hinge for orienting the display device at different viewing angles.

24. The modular wagering game machine sign of claim 22, wherein the center module includes another video display device.

* * * * *